(12) United States Patent
Katsuyama

(10) Patent No.: US 12,257,697 B2
(45) Date of Patent: Mar. 25, 2025

(54) TRANSPORTER

(71) Applicant: MURATA MACHINERY, LTD., Kyoto (JP)

(72) Inventor: Daisuke Katsuyama, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 744 days.

(21) Appl. No.: 17/615,848

(22) PCT Filed: Apr. 17, 2020

(86) PCT No.: PCT/JP2020/016838
§ 371 (c)(1),
(2) Date: Dec. 2, 2021

(87) PCT Pub. No.: WO2020/246153
PCT Pub. Date: Dec. 10, 2020

(65) Prior Publication Data
US 2022/0305674 A1    Sep. 29, 2022

(30) Foreign Application Priority Data
Jun. 6, 2019 (JP) ................. 2019-106126

(51) Int. Cl.
*B25J 15/06* (2006.01)
*B23K 26/38* (2014.01)
*B25J 15/00* (2006.01)

(52) U.S. Cl.
CPC .......... *B25J 15/0691* (2013.01); *B23K 26/38* (2013.01); *B25J 15/0061* (2013.01)

(58) Field of Classification Search
CPC . B25J 15/0052; B25J 15/0061; B66C 1/0243; B65G 47/918
(Continued)

(56) References Cited

U.S. PATENT DOCUMENTS 6,913,177 B2 * 7/2005 Steiner ................. B26D 7/1863
225/104
7,044,706 B2 * 5/2006 Jung ..................... B65G 47/90
414/737
(Continued)

FOREIGN PATENT DOCUMENTS

| EP | 2 921 251 A1 | 9/2015 |
| EP | 3 441 154 A1 | 2/2019 |
| JP | 2000-117373 A | 4/2000 |

OTHER PUBLICATIONS

Official Communication issued in corresponding European Patent Application No. 20819355.7, mailed on Mar. 4, 2024.
(Continued)

*Primary Examiner* — James R Bidwell
(74) *Attorney, Agent, or Firm* — Keating & Bennett, LLP

(57) ABSTRACT

A transporter includes a traveling body, a supporting body including first and second members with relative positions that can be mutually changed, a first suction pad on the first member, a second suction pad on the second member, a first presser on the first member, a second presser on the second member, the first and second suction pads being between the first and second pressers, and a controller to control the relative positions of the first and second members so that the first and second suction pads are positioned inside a contour of a product to be picked up and the first and second pressers are positioned above a workpiece outside the product.

7 Claims, 16 Drawing Sheets

(58) Field of Classification Search
USPC .......................................................... 294/65
See application file for complete search history.

(56) References Cited

U.S. PATENT DOCUMENTS

| | | |
|---|---|---|
| 2006/0118529 A1 | 6/2006 | Aoki et al. |
| 2009/0263218 A1* | 10/2009 | Katsuyama .......... B25J 15/0616 |
| | | 414/225.01 |
| 2010/0011928 A1* | 1/2010 | Lee ........................ C03B 33/07 |
| | | 83/109 |
| 2015/0290749 A1 | 10/2015 | Katsuyama |

OTHER PUBLICATIONS

Official Communication issued in International Patent Application No. PCT/JP2020/016838, mailed on Jul. 14, 2020.
Official Communication issued in corresponding European Patent Application No. 20819355.7, mailed on Jun. 1, 2023.

* cited by examiner

FIG. 6
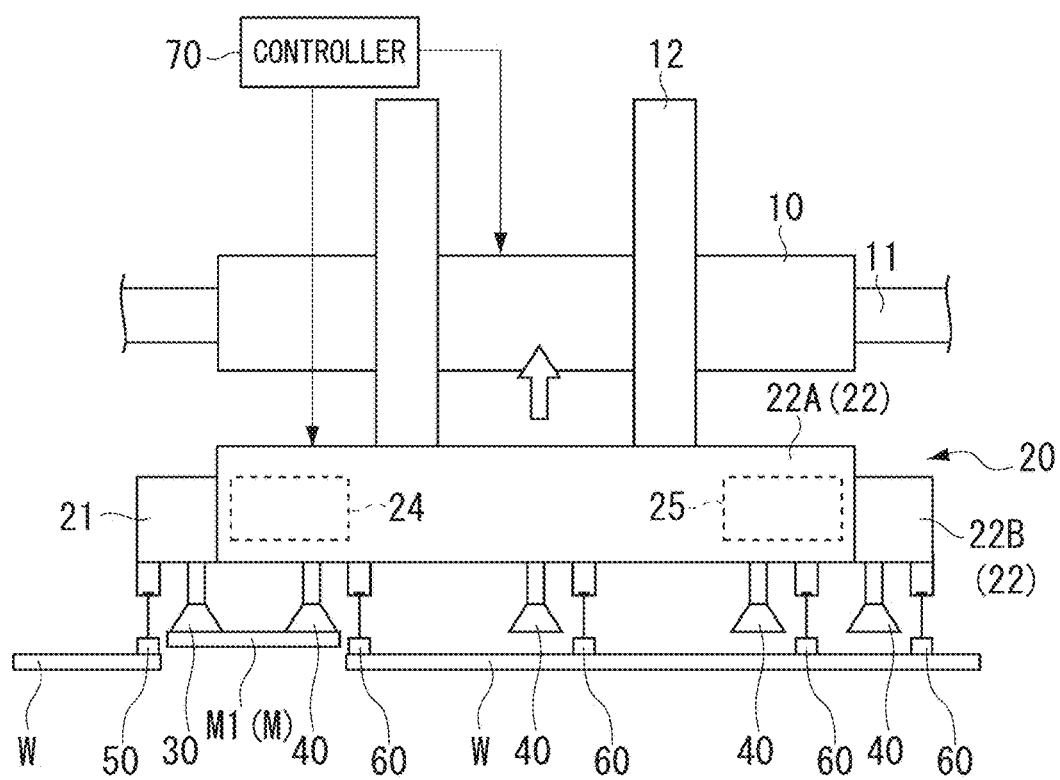
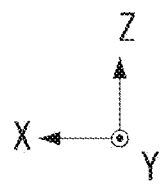

FIG. 16
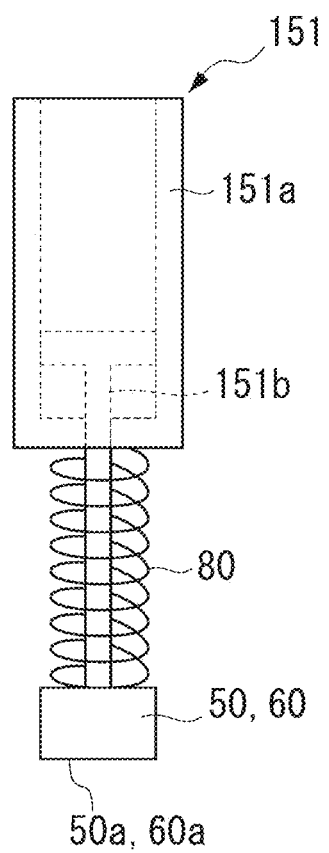
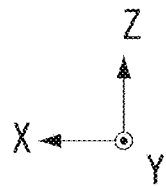

TRANSPORTER

BACKGROUND OF THE INVENTION

1. Field of the Invention

The present invention relates to a transporter.

2. Description of the Related Art

There is known a transporter that holds a product cut out from a plate-shaped workpiece by a laser processing machine or the like, and picks up the product from the workpiece, and transports the product (for example, see Japanese Unexamined Patent Application, First Publication No. 2000-117373). The transporter disclosed in Japanese Unexamined Patent Application, First Publication No. 2000-117373 includes suction pads each capable of adhering to a product.

SUMMARY OF THE INVENTION

When cutting a product out from a plate-shaped workpiece by a laser processing machine, the gap between the product and the residual material may be narrow in some cases. If the product is adhered to suction pads and lifted from the workpiece in this state, the product may catch the residual material and the residual material may also be lifted along with the product as a result. If the residual material is also lifted along with the product as mentioned above, there will be a problem in that the product cannot be appropriately picked up from the workpiece and product sorting cannot be performed, or that the positions of the residual material and other products may be shifted and product sorting cannot be performed appropriately.

Preferred embodiments of the present invention provide transporters each capable of picking up a product appropriately from a workpiece in a manner that prevents residual material from being also lifted along therewith when lifting the product from the workpiece.

A transporter according to an aspect of a preferred embodiment of the present invention is a transporter that holds a product cut out from a plate-shaped workpiece, picks up the product from the workpiece, and transports the product, the transporter including a traveling body, a supporting body on the traveling body and including a first member and a second member with relative positions that can be mutually changed, a first suction pad on the first member to adhere to the product, a first presser on the first member to be raised or lowered independent of the first suction pad, a second suction pad on the second member, and a second presser that is provided on the second member and can be raised or lowered independent of the second suction pad, the first suction pad and the second suction pad being between the first presser and the second presser, and a controller configured or programmed to control the relative positions of the first member and the second member so that the first suction pad and the second suction pad are positioned inside a contour of the product to be picked up, and the first presser and the second presser are positioned above the workpiece outside the product to be picked up.

The first presser may be provided on the first member via an elastic body, and in a state of having been lowered, a lower end of the first presser may be positioned below a lower end of the first suction pad, and the second presser may be provided on the second member via an elastic body, and in a state of having been lowered, a lower end of the second presser may be positioned below a lower end of the second suction pad. The second member may include a lift driver to raise or lower each of a plurality of the second members, and the controller may be configured or programmed to cause the lift driver to raise the second presser positioned above the product to be picked up above the lower end of the second suction pad. The first presser and the second presser may each include a rod. The rod may be arranged such that a longitudinal direction thereof is along a direction orthogonal or substantially orthogonal to the direction in which the first member and the second member move relative to each other. A plurality of the first suction pads may be provided along an extending direction of the first presser, and a plurality of the second suction pads may be provided along an extending direction of the second presser.

The second member may include a base and an extender that can move relative to the base in a direction in which the first member and the second member move relative to each other, and the second suction pad and the second presser may be provided on both the base and the extender. The supporting body may be movable in an orthogonal or substantially orthogonal direction that is orthogonal to a traveling direction of the traveling body. The controller may be configured or programmed to select the first suction pad and the second suction pad to be used according to a size of the product to be picked up, and control a position of the traveling body in the traveling direction thereof, a position of the supporting body in the orthogonal or substantially orthogonal direction, and the relative positions of the first member and the second member, so that the first suction pad and the second suction pad selected are positioned inside a contour of the product to be picked up, and that the first presser and the second presser are positioned above the workpiece outside the product to be picked up.

According to the above transporter, when the first suction pad and the second suction pad adhere to and lift a product, the first presser and the second presser press the workpiece outside the product, and it is therefore possible to pick up the product appropriately from the workpiece while preventing the residual material from being also lifted along therewith. Since the relative positions of the first member and the second member can be changed, it is possible to change the positional relationship between the first presser and the second presser according to the size of the product, and it is possible to appropriately pick up a product of a variety of sizes in a workpiece.

With the configuration in which the first presser is provided on the first member via an elastic body, and in a state of having been lowered, a lower end of the first presser is positioned below a lower end of the first suction pad, while the second presser is provided on the second member via an elastic body, and in a state of having been lowered, a lower end of the second presser is positioned below a lower end of the second suction pad, when the first suction pad and the second suction pad has adhered to and lifted a product, the compressed elastic bodies expand, and as a result, the workpiece can be more reliably pressed by the first presser and the second presser. With the configuration in which the second member includes a lift driver that raises or lowers each second member, and the controller is configured or programmed to cause the lift driver to raise the second presser positioned above a product to be picked up above the lower end of the second suction pad, the controller is configured or programmed to cause the lift driver to raise the second presser above the product to be picked up, and it is possible to avoid the workpiece from being pressed by the second presser more than necessary.

With the configuration in which each of the first presser and the second presser includes a rod, a workpiece can be pressed over a wide range in the direction in which the rod extends. With the configuration in which the rod is arranged such that a longitudinal direction thereof is along a direction orthogonal or substantially orthogonal to the direction in which the first member and the second member move relative to each other, the first member and the second member move relative to each other, and it is possible to increase the range in which the rod can be arranged. With the configuration in which a plurality of the first suction pads are provided along an extending direction of the first presser, and a plurality of the second suction pads are provided along an extending direction of the second presser, it is possible to reliably press the outside of a product, using the first presser and the second presser, while reliably holding the product, using a plurality of the first suction pads and the second suction pads.

With the configuration in which the second member includes a base and an extender that can move relative to the base in a direction in which the first member and the second member move relative to each other, and the second suction pad and the second presser are provided on both the base and the extender, it is possible to pick up a large product by extending the extender relative to the base. With the configuration in which the supporting body is movable in an orthogonal direction that is orthogonal or substantially orthogonal to a traveling direction of the traveling body, it is possible to position, in the horizontal direction, the supporting body with respect to a product in a workpiece. With the configuration in which the controller is configured or programmed to select the first suction pad and the second suction pad to be used according to the size of the product to be picked up, and controls the position of the traveling body in the traveling direction thereof, the position of the supporting body in the orthogonal direction, and the relative positions of the first member and the second member so that the first suction pad and the second suction pad selected are positioned inside a contour of the product to be picked up, and that the first presser and the second presser are positioned above the workpiece outside the product to be picked up, it is possible to appropriately arrange the first suction pad and the second suction pad as well as the first presser and the second presser, according to the product to be picked up.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a diagram showing a state of the product having been lifted from the workpiece.

FIG. 16 is a diagram showing another example of the first presser and the second presser.

DETAILED DESCRIPTION OF PREFERRED EMBODIMENTS

Figure 1:
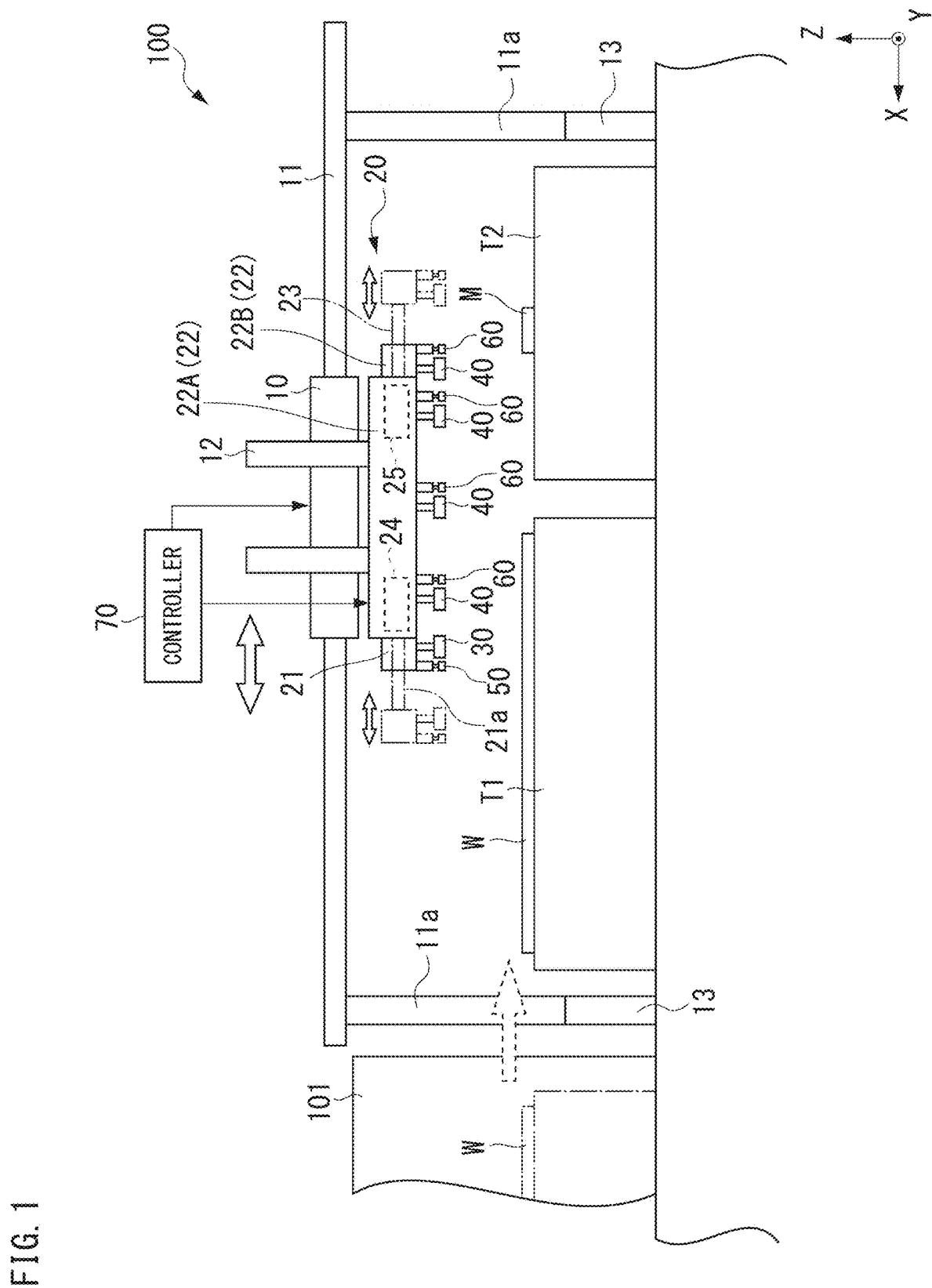
FIG. 1 is a diagram showing an example of a transporter according to a first preferred embodiment of the present invention.

The following describes preferred embodiments of the present invention, with reference to the drawings. However, the present invention is not limited to the preferred embodiments. Note that, in the drawings, scale is changed as necessary to illustrate the preferred embodiments, such as by enlarging or by emphasizing a portion or element. In the following drawings, an XYZ Cartesian coordinate system is used to describe the directions in each drawing. In the XYZ Cartesian coordinate system, a plane that is parallel or substantially parallel to a horizontal plane is defined as an XY plane. In the XY plane, a direction of transporting a product M from a workpiece W (a traveling direction of a traveling body 10 of a transporter 100) is denoted as an X direction, and a direction orthogonal to the X direction is denoted as a Y direction. A direction perpendicular or substantially perpendicular to the XY plane is denoted as Z direction. For each of the X direction, the Y direction, and the Z direction, description is made with a definition in which a direction indicated by an arrow is the positive (+) direction and a direction opposite to the direction indicated by the arrow is the negative (−) direction.

First Preferred Embodiment

Figure 2:
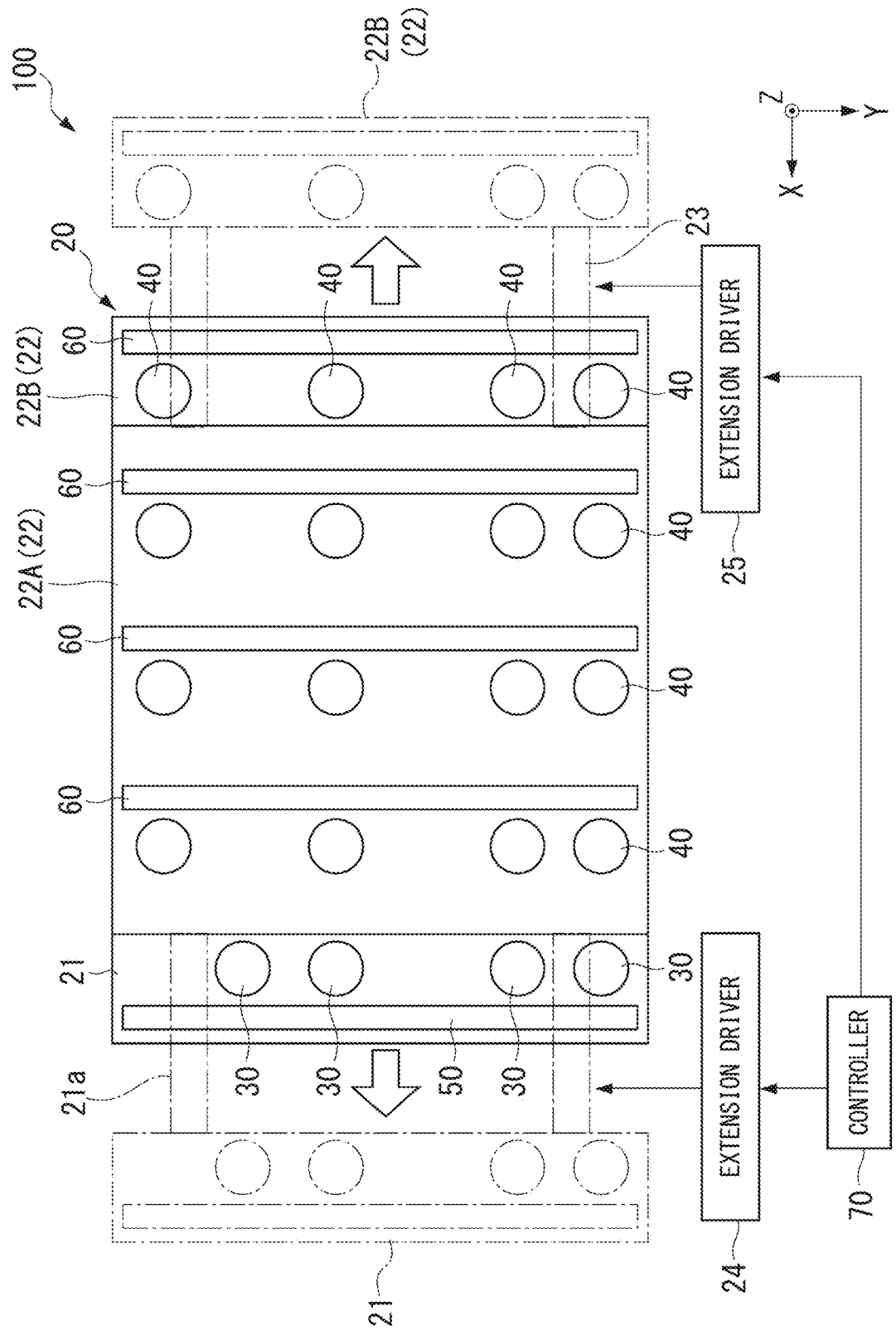
FIG. 2 is a plan view showing an example of a supporting body of the transporter.

FIG. 1 is a side view showing an example of a transporter 100 according to a first preferred embodiment. FIG. 2 is a plan view showing an example of a supporting body 20 of the transporter 100. As shown in FIG. 1 and FIG. 2, the transporter 100 holds a product M cut out from a plate-shaped workpiece W, for example, by a processing apparatus 101 such as a laser processing apparatus, picks up the product M from the workpiece W, and transports the product M. The transporter 100 includes a traveling body 10, a supporting body 20, first suction pads 30, second suction pads 40, a first presser 50, second pressers 60, and a controller 70.

The traveling body 10 can travel in the X direction along a traveling guide 11 by a traveling driver not shown in the drawings. The traveling guide 11 is provided along the X direction above a sorting table T1 and a product table T2 which are arranged side-by-side along the X direction. The traveling body 10 moves between above the sorting table T1 and above the product table T2. The traveling guide 11 is provided extending across from the +X side of the sorting table T1 to the −X side of the product table T2, and is supported by a plurality of struts 11a. The struts 11a can move in the Y direction along guides 13 along the Y direction. Therefore, the traveling guide 11 can move in the Y direction.

The sorting table T1 is arranged on the −X side of the processing apparatus 101, and the workpiece W having been processed by the processing apparatus 101 is placed on the sorting table T1. The workpiece W may be transported out from the processing apparatus 101 by another transporter, or the workpiece W placed on a pallet or the like may be transported out from the processing apparatus 101 and then placed on the sorting table T1. The product table T2 is arranged on the −X side of the sorting table T1, and a product M to be picked up by the transporter 100 from the workpiece W placed on the sorting table T1 is placed thereon. For example, each type of products M picked up are stacked and placed on the product table T2.

The traveling body 10 holds lifting bodies 12 to raise or lower the supporting body 20, which will be described later, so as to be able to raise or lower the lifting bodies 12. The two lifting bodies 12 are arranged at an interval in the X direction, and each thereof is provided so as to extend from the supporting body 20 in the +Z direction (upward). The traveling body 10 includes a lift driver not shown in the drawings, and the lifting bodies 12 (supporting body 20) are raised or lowered by driving the lift driver.

The supporting body 20 is supported on the traveling body 10 via the lifting bodies 12, and moves in the X direction integrally with the traveling body 10. As the traveling guide 11 moves in the Y direction, the supporting body 20 supported on the traveling body 10 also moves in the Y direction. That is to say, the supporting body 20 is movable (along the horizontal plane) in both the X and Y directions. The supporting body 20 is raised or lowered (moved in the Z direction) by the lift driver (not shown in the drawings) included in the traveling body 10. As shown in FIG. 1 and FIG. 2, the supporting body 20 includes a first member 21 and a second member 22. The first member 21 and the second member 22 are arranged side-by-side along the X direction. The first member 21 is arranged on the +X side with respect to the second member 22. Each of the first member 21 and the second member 22 preferably has a rectangular shape or a box shape, for example, with a rod-shaped structural member.

The first member 21 and the second member 22 have the same or substantially the same dimensions in the Y direction. The dimension of the second member 22 in the X direction is greater than that of the first member 21. Therefore, it is possible to provide a plurality of sets of the second suction pads 40 and the second presser 60, which will be described later, in the X direction. The first member 21 includes extension guides 21a. The extension guides 21a are held by the second member 22 so as to be movable in the X direction. Therefore, it is possible to mutually change the relative positions of the first member 21 and the second member 22 in the X direction by moving the first member 21 in the X direction relative to the second member 22.

The first member 21 is arranged in contact with the side surface on the +X side of the second member 22. The first member 21 is moved in the X direction relative to the second member 22 by an extension driver 24 included in the second member 22. By moving the first member 21 in the X direction relative to the second member 22, the +X side of the supporting body 20 can be extended or retracted in the X direction. Even when the first member 21 has moved in the X direction relative to the second member 22, the first member 21 moves integrally with the second member 22 in the X direction, the Y direction, and the Z direction.

The second member 22 is provided at the lower ends of the lifting bodies 12. The second member 22 is suspended from the traveling body 10 via the lifting bodies 12. The second member 22 moves in the X direction as the traveling body 10 moves in the X direction. Also, the second member 22 is raised or lowered by the lift driver not shown in the drawings. That is to say, the first member 21 and the second member 22 move integrally together in the X direction and the Y direction, and are also raised or lowered integrally together. The second member 22 has a base 22A and an extender 22B. The base 22A is provided at the lower ends of the lifting bodies 12. The extender 22B is arranged in contact with the side surface on the −X side of the base 22A. The extender 22B is moved in the X direction relative to the base 22A by an extension driver 25 included in the base 22A. By moving the extender 22B in the X direction relative to the base 22A, the −X side of the second member 22 can be extended or retracted in the X direction. The extender 22B includes extension guides 23. The extension guides 23 are held by the base 22A so as to be movable in the X direction.

The extension driver 24 included in the second member 22 (base 22A) causes the first member 21 to move in the X direction. The extension driver 24 has, for example, a drive source such as an electric motor or the like not shown in the drawings, and a transmission that transmits the driving force of the drive source to the extension guides 21a of the first member 21. The extension driver 25 included in the base 22A causes the extender 22B to move in the X direction. The extension driver 25 has, for example, a drive source such as an electric motor or the like not shown in the drawings, and a transmission that transmits the driving force of the drive source to the extension guides 23 of the extender 22B.

The first suction pads 30 are provided on the first member 21 and are to adhere to the product M. A plurality of the first suction pads 30 are arranged side-by-side along the Y direction. When the dimension of the product M in the Y direction is large, the plurality of first suction pads 30 adhering to the product M enables stable transportation of the product M. In the present preferred embodiment, a configuration will be described as an example in which four of the first suction pads 30 are arranged side-by-side along the Y direction; however, the number of the first suction pads 30 is not limited to four, and it may be three or less or five or more. Moreover, the plurality of first suction pads 30 are arranged arbitrarily, and may be arranged at regular or irregular intervals.

The second suction pads 40 are provided on the second member 22 and are to adhere to the product M. The second suction pads 40 are provided on both the base 22A and the extender 22B. A plurality of the second suction pads 40 are arranged side-by-side along the Y direction. As in the case of the first suction pads 30, when the dimension of the product M in the Y direction is large, the plurality of second suction pads 40 adhering to the product M enables stable transportation of the product M. In the present preferred embodiment, a configuration will be described as an example in which four of the second suction pads 40 are arranged side-by-side along the Y direction; however, the number of the second suction pads 40 is not limited to four, and it may be three or less or five or more. Also, in the present preferred embodiment, a configuration will be described as an example in which the second suction pads 40 are provided in three rows along the Y direction on the base 22A; however, the number of rows of the second suction pads 40 along the Y direction is not limited to three, and it may be two or less or four or more. In the present preferred embodiment, a configuration will be described as an example in which the second suction pads 40 are provided in one row along the Y direction on the extender 22B; however, the number of rows of the second suction pads 40 along the Y direction is not limited to one, and it may be two or more. The plurality of second suction pads 40 are arranged arbitrarily, and may be arranged at regular or irregular intervals. The number of the second suction pads 40 in the Y direction may or may not be the same as the number of the first suction pads 30.

The first presser 50 is provided on the first member 21 and can be raised or lowered independent of the first suction pads 30. The first presser 50 presses the workpiece W on the outside of the product M to be picked up. The first presser 50 is a rod-shaped member having a shape that extends in the Y direction. Therefore, the first presser 50 is arranged such that the longitudinal direction thereof (Y direction) is along a direction orthogonal or substantially orthogonal to the X direction in which the first member 21 and the second member 22 move relative to each other.

The second pressers 60 are provided on the second member 22 and can be raised or lowered independent of the second suction pads 40. The second pressers 60 are provided on both the base 22A and the extender 22B. As in the case of the first presser 50, the second presser 60 presses the workpiece W outside the product M to be picked up. Each second presser 60 is a rod-shaped member having a shape that extends in the Y direction. Therefore, each second presser 60 is arranged such that the longitudinal direction thereof (Y direction) is along a direction orthogonal or substantially orthogonal to the X direction in which the first member 21 and the second member 22 move relative to each other.

As shown in FIG. 1 and FIG. 2, a set of one row of the first suction pads 30 and the first presser 50 are arranged on the first member 21. On the first member 21, the first presser 50 is arranged on the +X side of the first suction pads 30. On the −X side of the first presser 50, the first suction pads 30 are arranged in one row in the Y direction along the extending direction of the first presser 50.

A plurality of sets of one row of the second suction pads 40 and the second presser 60 are arranged on the base 22A of the second member 22. Each second presser 60 is arranged on the −X side of the second suction pads 40. Therefore, as shown in FIG. 1 and FIG. 2, the first suction pads 30 and the second suction pads 40 are arranged between the first presser 50 and the second presser 60. Neither the first presser 50 nor the second presser 60 is arranged between the first suction pads 30 and the second suction pads 40. On the +X side of the second presser 60, the second suction pads 40 are arranged in one row in the Y direction along the extending direction of the second presser 60. On the extender 22B of the second member 22, the second presser 60 is arranged on the −X side of the second suction pads 40.

The first suction pads 30 and the second suction pads 40 mentioned above are connected to a suction device not shown in the drawings through tubing. The suction device is installed, for example, on the floor surface or the like and away from the transporter 100. The tubing connecting the suction device to the first suction pads 30 are provided in a manner such that when the first member 21 extends or retracts relative to the second member 22, the tubing follow the movement thereof. The tubing connecting the suction device to the second suction pads 40 of the extender 22B are provided in a manner such that when the extender 22B extends or retracts relative to the base 22A, the tubing follow the movements thereof. Each of the plurality of first suction pads 30 and the plurality of second suction pads 40 is connected through a switching valve to the tubing, so that suction thereof can be performed individually.

Figure 3:
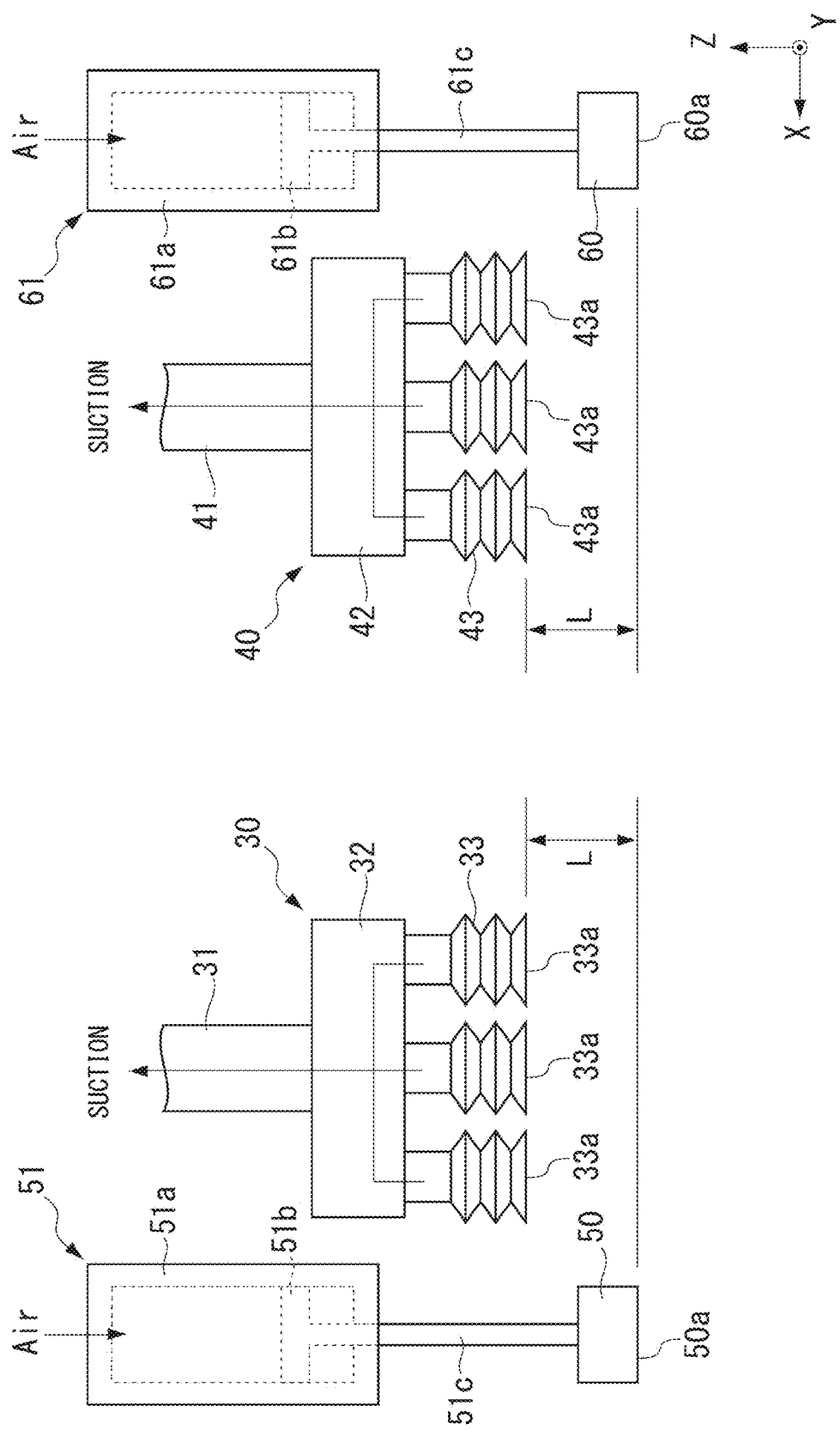
FIG. 3 is a diagram showing a first suction pad and a second suction pad as well as a first presser and a second presser.

FIG. 3 is a diagram showing the first suction pad 30 and the second suction pad 40 as well as the first presser 50 and the second presser 60. As shown in FIG. 3, the first suction pad 30 includes a coupler 31, a base 32, and adherers 33. The coupler 31 connects the first member 21 and the base 32. The base 32 is provided at the lower end of the coupler 31 and holds a plurality of the adherers 33. A plurality of the adherers 33 are arranged side-by-side at the lower end of the base 32. Each adherer 33 is provided in a bellows shape and is made of an elastic material, for example, and has elasticity at least in the vertical direction (Z direction).

Each adherer 33 includes an adhering opening 33a at the lower end thereof. The adhering openings 33a all preferably have the same or substantially the same height in the Z direction. Each adherer 33 is connected to a suction channel in the base 32 and the coupler 31. Therefore, the adherers 33 all simultaneously attract the product M by suction through the suction channel mentioned above. The number and arrangement of the adherers 33 can be arbitrarily set.

The second suction pad 40 is of a configuration similar to that of the first suction pad 30, and has a coupler 41, a base 42, and adherers 43. The coupler 41 connects the second member 22 (base 22A and extender 22B) and the base 42. The base 42 is provided at the lower end of the coupler 41 and holds a plurality of the adherers 43. A plurality of the adherers 43 are arranged side-by-side at the lower end of the base 42. Each adherer 43 is provided in a bellows shape and is formed with an elastic material, for example, and has elasticity at least in the vertical direction (Z direction).

Each adherer 43 includes an adhering opening 43a at the lower end thereof. The adhering openings 43a are all arranged having the same or substantially the same height in the Z direction. The height of each adhering opening 43a is set to be the same as or substantially the same as the height of the adhering opening 33a of the first suction pad 30 described above. Each adherer 43 is connected to a suction channel in the base 42 and the coupler 41. Therefore, the adherers 43 all simultaneously attract the product M by suction through the suction channel mentioned above. The number and arrangement of the adherers 43 can be arbitrarily set. The second suction pad 40 is not limited to having a configuration similar to that of the first suction pad 30, and may have a configuration different from that of the first suction pad 30.

The first presser 50 is provided at the lower end of a lift driver 51 described later. The lift driver 51 is provided on the first member 21. The first presser 50 can be raised or lowered by the lift driver 51. In the state where the first presser 50 has been lowered, a lower end 50a of the first presser 50 is positioned below and away by a distance L from the adhering opening 33a of the first suction pad 30. That is to say, when the supporting body 20 is lowered, the first presser 50 comes into contact with the workpiece W before the first suction pad 30 does.

The lift driver 51 is, for example, an air cylinder device, and has a cylinder 51a, a piston 51b, and a rod 51c. An air supply device not shown in the drawings is connected to the space on the upper side of (on the +Z side of) the piston 51b within the cylinder 51a. This air supply device may be mounted on the first member 21 or the second member 22, or may be arranged outside the transporter 100 through tubing.

The piston 51b can move in the Z direction within the cylinder 51a. The rod 51c is fixed to the piston 51b and extends downward. The rod 51c penetrates the lower portion of the cylinder 51a and is coupled to the first presser 50. The lift driver 51 raises or lowers the piston 51b and the rod 51c by the air supply device not shown in the drawings adjusting the pressure in the upper space within the cylinder 51a. The first presser 50 is raised or lowered by raising or lowering the piston 51b and the rod 51c.

Also, by using an air cylinder device as the lift driver 51, it is possible to give the first presser 50 elasticity in the vertical direction (Z direction). That is to say, by compressing the air in the upper space within the cylinder 51a, the first presser 50 (piston 51b) can be elastically raised relative to the cylinder 51a.

As in the case of the first presser 50, the second presser 60 is provided at the lower end of a lift driver 61 described later. The lift driver 61 is provided on the second member 22. The second presser 60 can be raised or lowered by the lift driver 61. In the state where the second presser 60 has been lowered, a lower end 60a of the second presser 60 is positioned below and away by the distance L from the adhering opening 43a of the second suction pad 40. That is to say, when the supporting body 20 is lowered, the second presser 60 comes into contact with the workpiece W before the second suction pad 40 does. The height of the lower end 60a of the second presser 60 is set to be the same as or substantially the same as the height of the lower end 50a of the first presser 50.

The lift driver 61 is, for example, an air cylinder device, and has a cylinder 61a, a piston 61b, and a rod 61c. An air supply device not shown in the drawings is connected to the space on the upper side of (on the +Z side of) the piston 61b within the cylinder 61a. This air supply device may be mounted on the second member 22, or may be arranged outside the transporter 100 through tubing. Also, the air supply device may be shared by the lift driver 51 and the lift driver 61 mentioned above, or separate air supply devices may be provided therefor.

The piston 61b can move in the Z direction within the cylinder 61a. The rod 61c is fixed to the piston 61b and extends downward. The rod 61c penetrates the lower portion of the cylinder 61a and is coupled to the second presser 60. The lift driver 61 raises or lowers the piston 61b and the rod 61c by the air supply device not shown in the drawings adjusting the pressure in the upper space within the cylinder 61a. The second presser 60 is raised or lowered by raising or lowering the piston 61b and the rod 61c.

Moreover, by using an air cylinder device as the lift driver 61, it is possible to give the second presser 60 elasticity in the vertical direction (Z direction). That is to say, by compressing the air in the upper space within the cylinder 61a, the second presser 60 (piston 61b) can be elastically raised relative to the cylinder 61a. A plurality of the second pressers 60 are arranged on the second member 22. The second pressers 60 can each be raised or lowered individually by the lift driver 61.

The controller 70 comprehensively controls respective portions and elements of the transporter 100. The controller 70 may be configured or programmed to control traveling and stop positions (including stop positions of the struts 11a in the Y direction on the guides 13) of the traveling body 10. The controller 70 may be configured or programmed to drive a lifting device included in the traveling body 10 to control raising/lowering of and raising/lowering positions of the supporting body 20. The controller 70 may be configured or programmed to control, for example, the extension drivers 24, 25, to thereby control the relative positions of the first member 21 and the second member 22 and the relative positions of the base 22A and the extender 22B of the second member 22 respectively. The controller 70 can control the positions of the first member 21 and the second member 22 (base 22A and extender 22B) so that the first suction pads 30 and the second suction pads 40 are positioned inside a contour of the product M to be picked up, and that the first presser 50 and the second presser 60 are positioned above the workpiece W outside the product M to be picked up.

Moreover, the controller 70 may be configured or programmed to control the suction operation performed by the first suction pads 30 and the second suction pads 40. For example, the controller 70 may be configured or programmed to drive the suction device not shown in the drawings and operates the switching valves provided in the tubing to select either the first suction pads 30 or the second suction pads 40 to perform the suction operation. The controller 70 may be configured or programmed to select either the first presser 50 or the second presser 60 by controlling the lift drivers 51, 61, and control the raising/lowering position of each thereof.

Figure 4A:
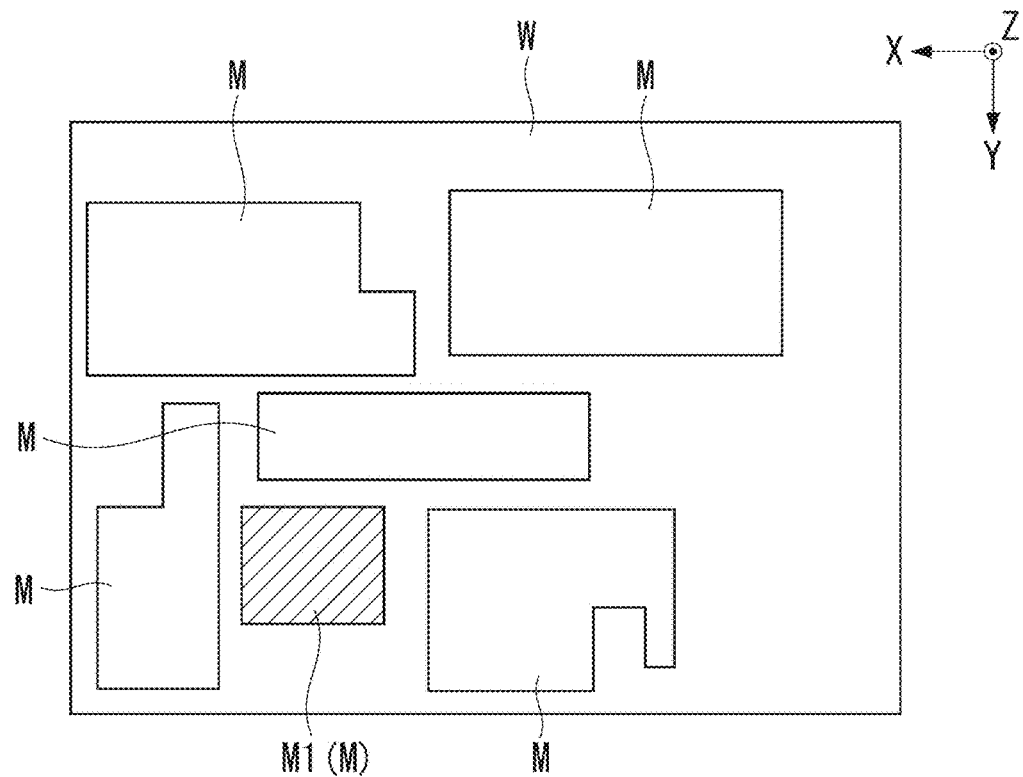
FIG. 4A is a diagram showing the position of a product formed in a workpiece.
Figure 4B:
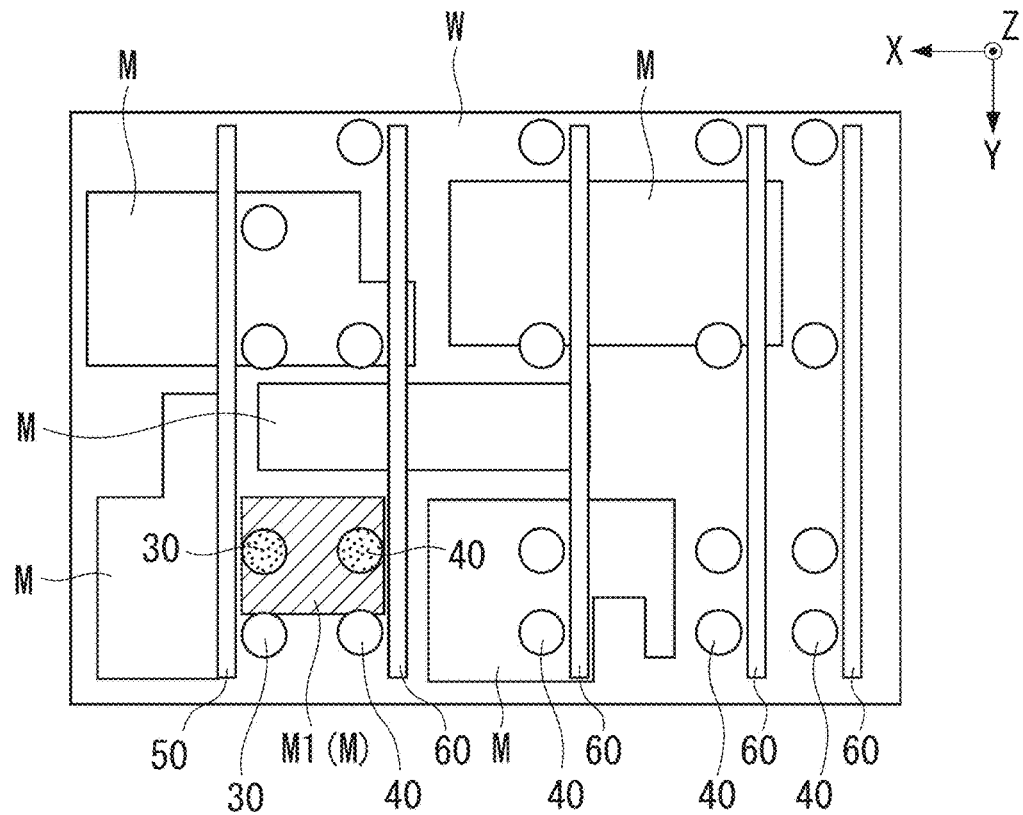
FIG. 4B is a plan view showing an example arrangement of the transporter with respect to the workpiece.

Next, the operation of the transporter 100 configured as described above will be described. The transporter 100 is operated by the controller 70 controlling the respective portions and elements thereof. FIG. 4A to FIG. 6 are diagrams for describing an example of the operation of transporter 100. FIG. 4A is a diagram showing an example of a workpiece W processed by the processing apparatus 101, and showing the position of a product M1 in the workpiece W. FIG. 4B is a plan view showing an example of the arrangement of the transporter 100 (supporting body 20) with respect to the workpiece W.

The workpiece W cut up by the processing apparatus 101 is arranged on the sorting table T1 by a transporter not shown in the drawings or the like. In FIG. 4A, a plurality of products M have been cut out from the workpiece W. After the processed workpiece W has been arranged on the sorting table T1, the controller 70 instructs the transporter 100 to transport a product M1, which has been cut out, to the product table T2. In FIG. 4A, the product M1 to be transported is denoted with hatched lines. Hereinafter, a case of transporting the product M1 denoted with hatched lines will be described as an example.

Figure 5A:
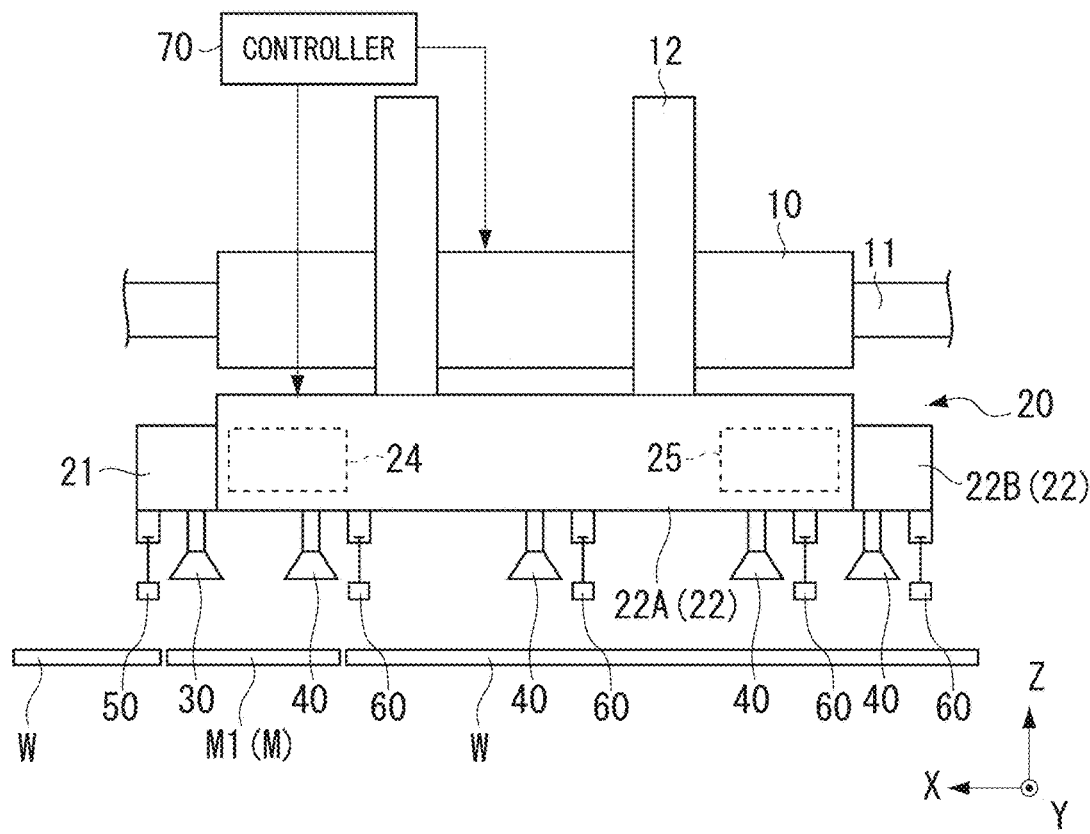
FIG. 5A is a diagram showing the transporter having been arranged with respect to a product in the workpiece.

FIG. 5A is a diagram showing the transporter 100 having been arranged with respect to the product M1 in the workpiece W. As shown in FIG. 5A, the controller 70 causes the traveling body 10 to travel in the X direction and causes the struts 11a to move in the Y direction along the guides 13, to arrange the supporting body 20 above the workpiece W. In such a case, the controller 70 selects the first suction pads 30 and the second suction pads 40 corresponding to the product M1 to be picked up, and controls the positions of the first member 21 and the second member 22, so that the first suction pads 30 and the second suction pads 40 selected are positioned inside a contour of the product M1, that is to say, the first suction pads 30 and the second suction pads 40 overlap with the product M1 as seen in a plan view, and that the first presser 50 and the second presser 60 are positioned above the workpiece W outside the product M1 to be picked up. FIG. 4B shows the state illustrated in FIG. 5A as seen in a plan view.

Figure 5B:
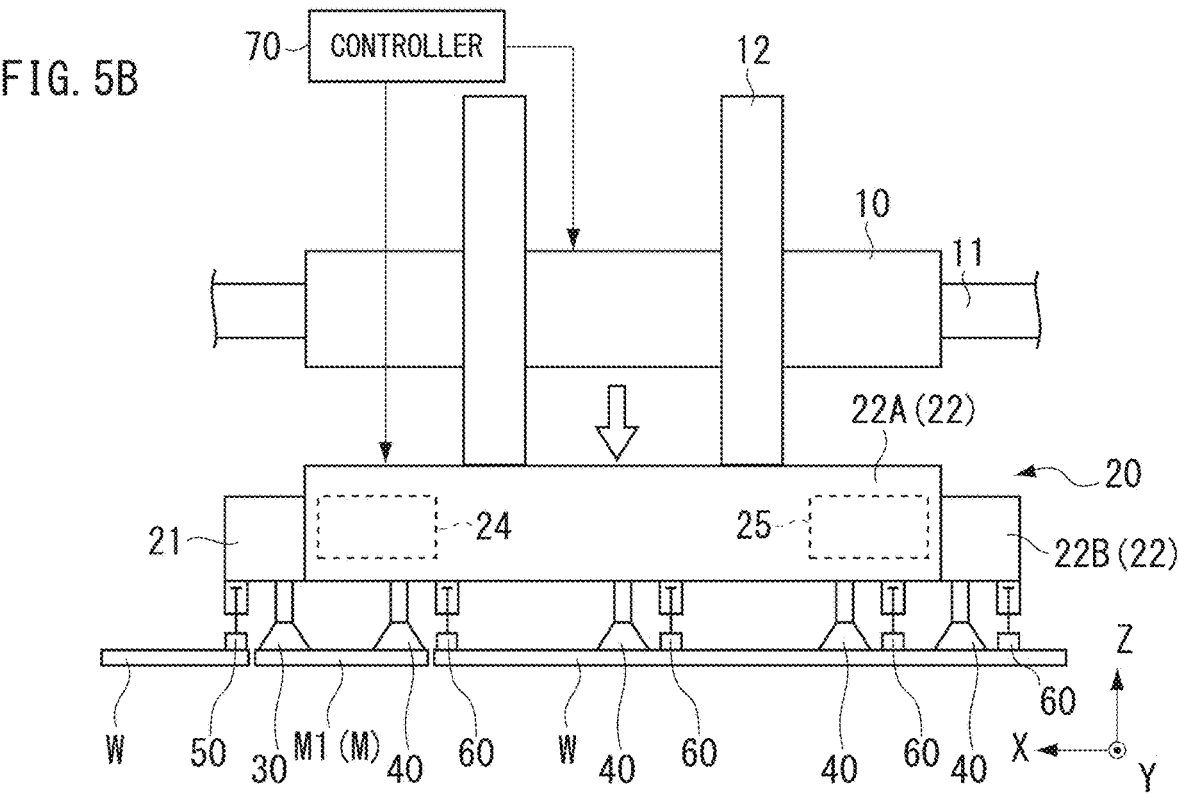
FIG. 5B is a diagram showing a state of the product in the workpiece being adhered.

FIG. 5B is a diagram showing the state of having adhered to the product M1 in the workpiece W. As shown in FIG. 5B, the controller 70 lowers the supporting body 20 and causes the first suction pads 30 and the second suction pads 40 to press against the product M1. It should be noted that the controller 70 controls the lift drivers 51, 61 in advance to position the lower ends of the first presser 50 and the second presser 60 below the lower ends of the first suction pads 30 and the second suction pads 40. The controller 70 drives the suction device not shown in the drawings and operates the switching valves to start the suction operation of the first suction pads 30 and the second suction pads 40 corresponding to the product M1.

The first suction pads 30 and the second suction pads 40 adhere to the product M1 by being pressed against the product M1. In this state, the first presser 50 and the second presser 60 are in contact with the workpiece W outside the product M1 and are being pushed upward. The first presser 50 and the second presser 60 are in contact with the area around the product M1 or the area in the vicinity of the product M1 to be picked up. The first presser 50 and the second presser 60 may be arranged so as to come into contact with another product M that is not to be picked up, or may be arranged so as not to come into contact with another product M. The lift drivers 51, 61 apply a downward pressing force to the first presser 50 and the second presser 60. As a result, the workpiece W outside the product M1 is pressed against the sorting table T1 (see FIG. 1) by the first presser 50 and the second presser 60. There are portions in the workpiece W outside the product M1 that are not pressed directly by the first presser and the second presser 60. However, these portions are a continuation of the portions pressed by the first presser 50 and the second presser 60, and are thus pressed indirectly thereby. That is to say, the workpiece W around the product M1 is pressed all around.

FIG. 6 is a diagram showing a state of the product M1 having been lifted from the workpiece W. After the first suction pads 30 and the second suction pads 40 have adhered to the product M1, the controller 70 raises the supporting body 20 to lift the product M1. At this time, the lift drivers 51, 61 are applying a downward elastic force to the first presser 50 and the second presser 60, and therefore, the first presser 50 and the second presser 60 extend downward as the supporting body 20 is raised to temporarily maintain the state of pressing against the workpiece W outside the product M1. Such an operation enables the first suction pads 30 and the second suction pads 40 to lift the product M1 while the workpiece W is pressed by the first presser 50 and the second presser 60, and prevents the residual material of the workpiece W outside the product M1 from being also lifted along therewith.

In the above description, the first presser 50 and the second presser 60 perform pressing, using the elastic force of the lift drivers 51, 61. However, preferred embodiments of the present invention are not limited to this operation. For example, the first presser 50 and the second presser 60 may be lowered by supplying air to the lift drivers 51, 61 from the air supply device in synchronization with the supporting body 20 being raised to push the pistons 51b, 61b downward.

After having raised the supporting body 20 further to thereby separate the first presser 50 and the second presser 60 from the workpiece W, the controller 70 causes the traveling body 10 to travel in the X direction with the product M1 adhered, causes the struts 11a to move in the Y direction along the guides 13, and causes the traveling body 10 to stop at a predetermined position above the product table T2 (see FIG. 1). Subsequently, the controller 70 drives the lifting device not shown in the drawings to lower the supporting body 20, and stops the driving of the suction device not shown in the drawings, to thereby place the product M1 on the product table T2. Through such a series of operations, the product M (M1) can be reliably picked up from the workpiece W and transported to the product table T2.

Figure 7A:
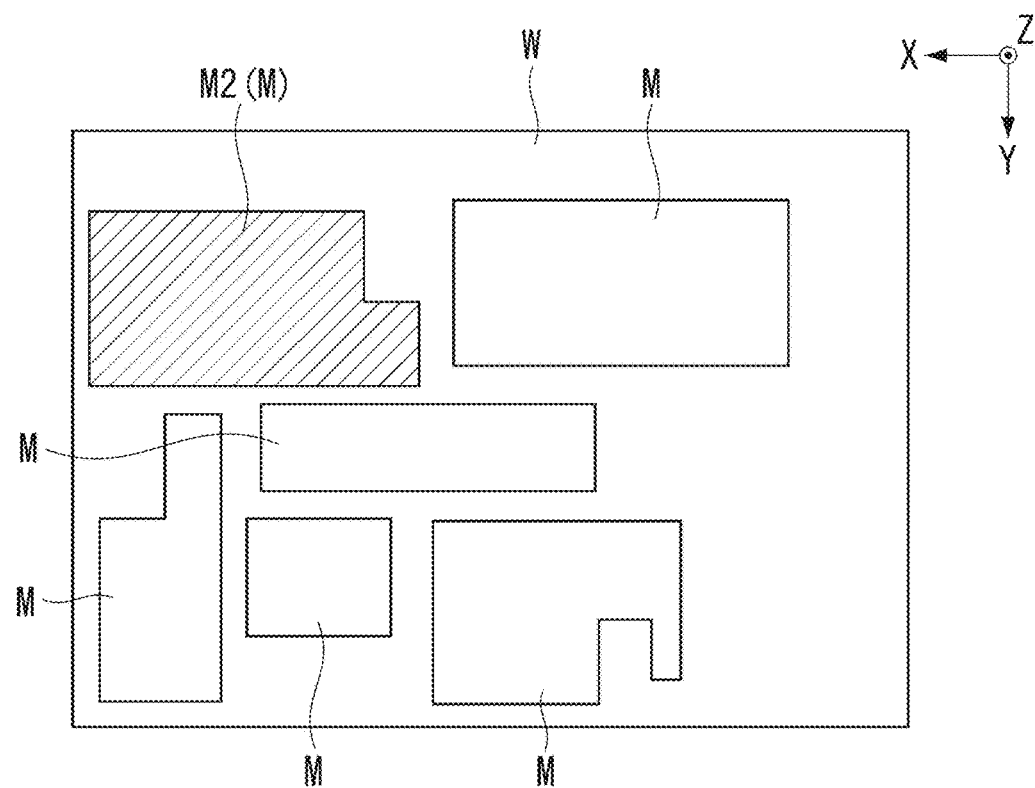
FIG. 7A is a diagram showing the position of another product formed in a workpiece.

FIGS. 7A to 9 are diagrams for describing another example of the operation of transporter 100. FIG. 7A is a diagram showing an example of the workpiece W processed by the processing apparatus 101, and showing the positions of other products M formed in the workpiece W. FIG. 7B is a plan view showing another example of the arrangement of the transporter 100 (supporting body 20) with respect to the workpiece W. In FIG. 7A, a product M2 to be transported is denoted with hatched lines. Hereinafter, a case of transporting the product M2 denoted with hatched lines will be described as an example.

Figure 7B:
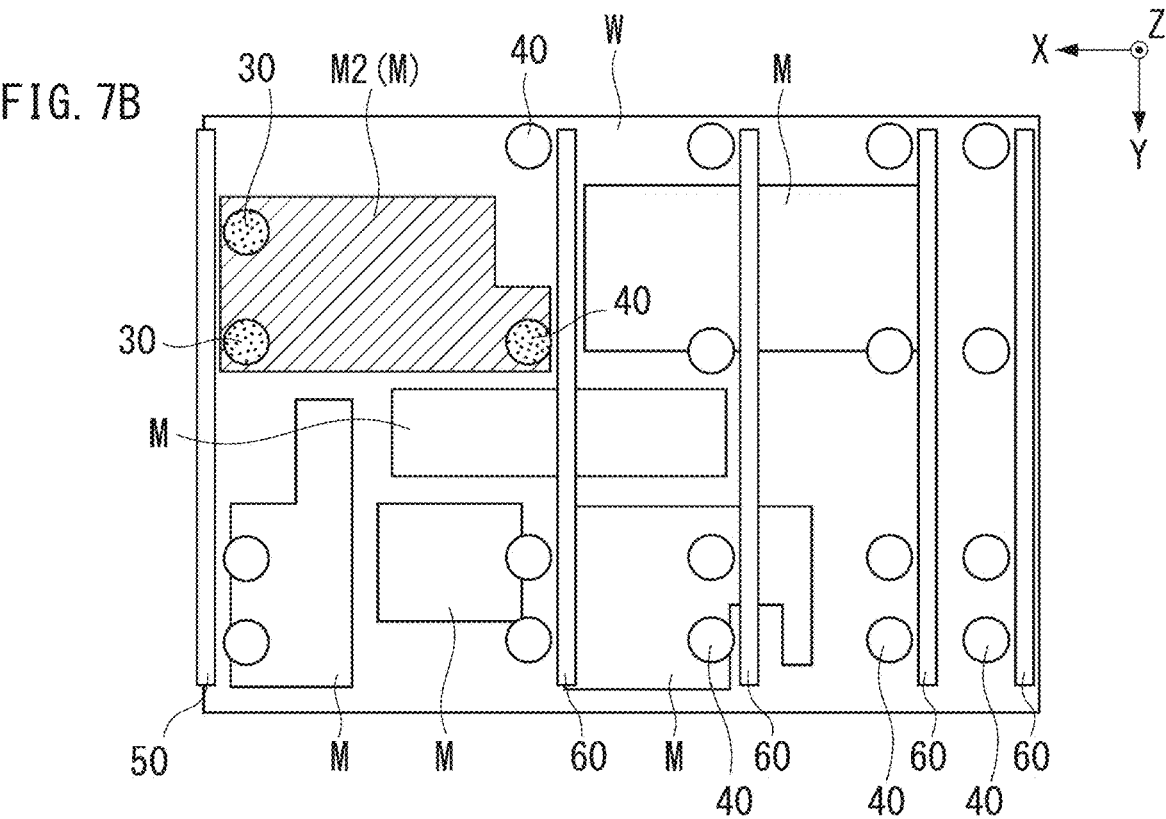
FIG. 7B is a plan view showing an example arrangement of the transporter with respect to the workpiece.
Figure 8A:
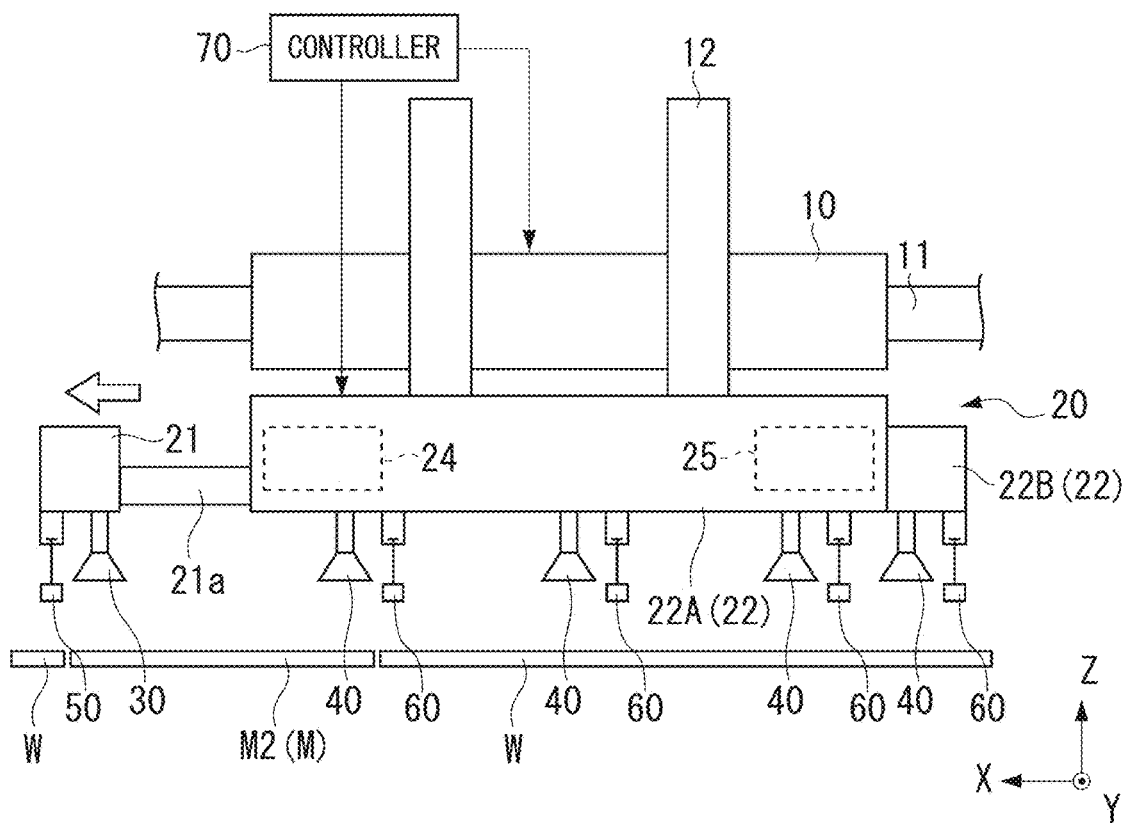
FIG. 8A is a diagram showing the transporter having been arranged with respect to a product in the workpiece.

FIG. 8A is a diagram showing the transporter 100 having been arranged with respect to the product M2 in the workpiece W. As shown in FIG. 8A, the controller 70 causes the traveling body 10 to travel in the X direction, to arrange the supporting body 20 above the workpiece W. In such a case, the controller 70 controls the positions of the first member 21 and the second member 22, so that the first suction pads 30 and the second suction pads 40 are positioned inside a contour of the product M2, that is to say, the first suction pads 30 and the second suction pads 40 are arranged overlapping with the product M2 as seen in a plan view, and that the first presser 50 and the second presser 60 are positioned above the workpiece W outside the product M2. FIG. 7B shows the state illustrated in FIG. 8A as seen in a plan view.

It should be noted that the dimension of the product M2 in the X direction is larger than that of product M1 shown in FIGS. 4A and 4B. The controller 70 moves the first member 21 in the +X direction relative to the second member 22 to thereby arrange the first suction pads 30 above the +X side end of the product M2 and arrange the first presser 50 above the workpiece W outside on the +X side with respect to the product M2.

Figure 8B:
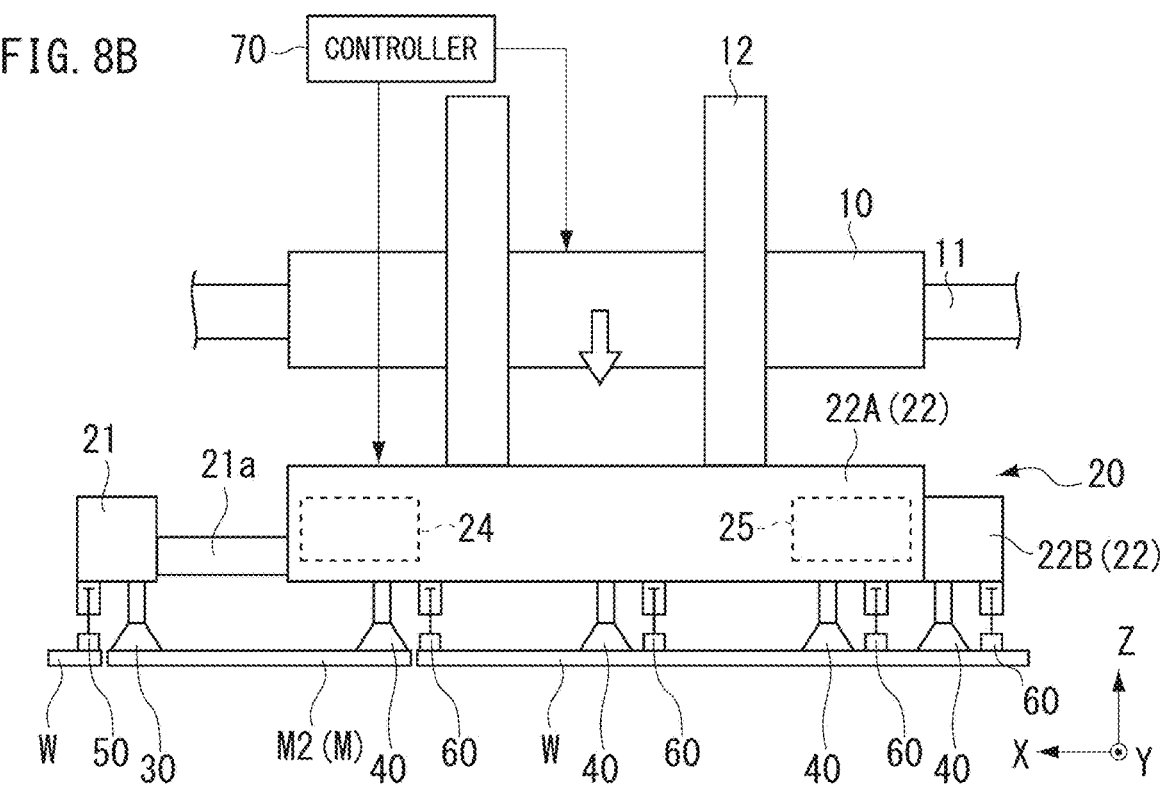
FIG. 8B is a diagram showing a state of the product in the workpiece being adhered.

FIG. 8B is a diagram showing the state of having adhered to the product M2 in the workpiece W. As shown in FIG. 8B, the controller 70 lowers the supporting body 20 and causes the first suction pads 30 and the second suction pads 40 to press against the product M2. It should be noted that the controller 70 controls the lift drivers 51, 61 in advance to position the first presser 50 and the second presser 60 below the lower ends of the first suction pads 30 and the second suction pads 40. The controller 70 drives the suction device not shown in the drawings and operates the switching valves to start the suction operation of the first suction pads 30 and the second suction pads 40 corresponding to the product M2.

The first suction pads 30 and the second suction pads 40 adhere to the product M2 by being pressed against the product M2. In this state, as with the state illustrated in FIG.

5B described above, the first presser 50 and the second presser 60 are in contact with the workpiece W outside the product M2 and are being pushed upward, while pressing the workpiece W outside the product M2 against the sorting table T1 (see FIG. 1).

Figure 9:
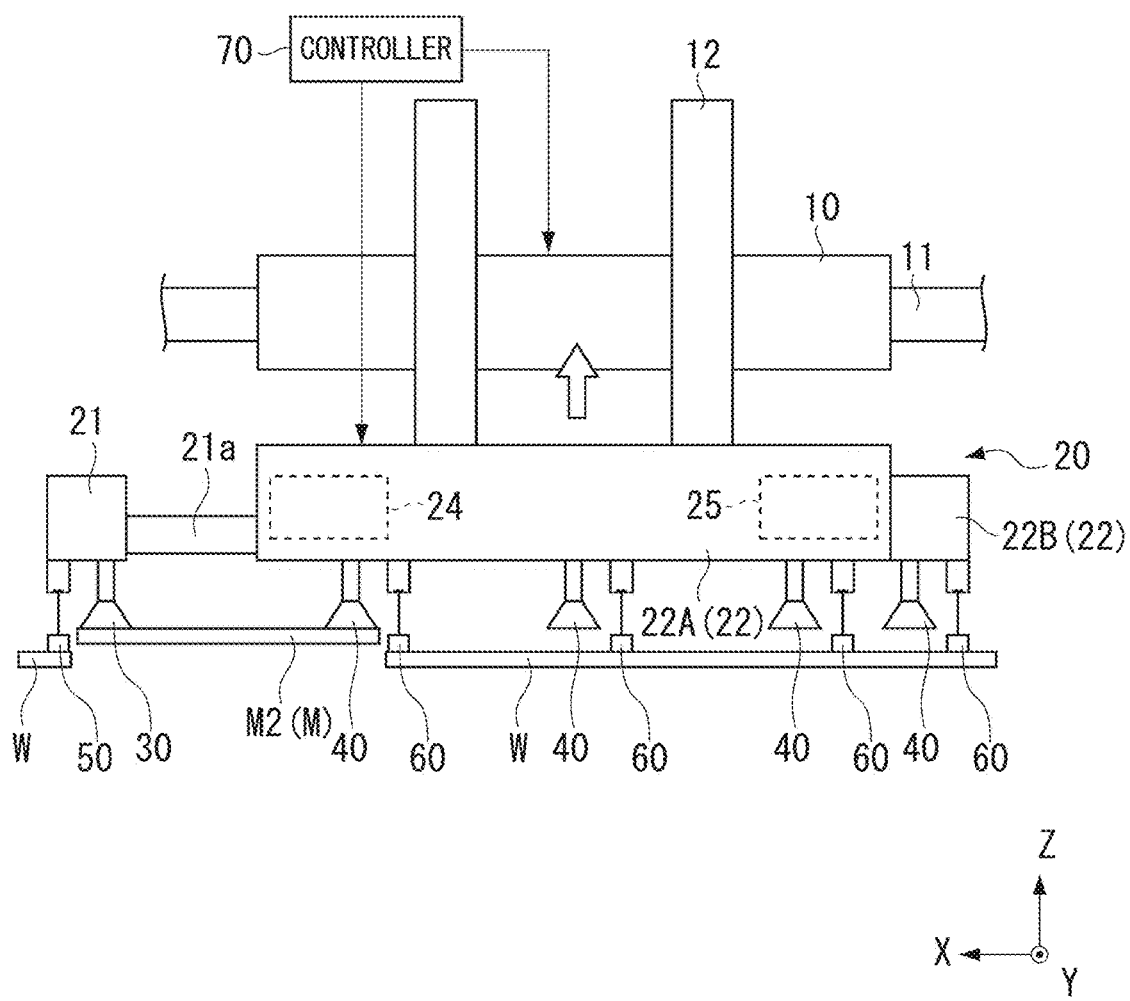
FIG. 9 is a diagram showing a state of the product having been lifted from the workpiece.

FIG. 9 is a diagram showing a state of the product M2 having been lifted from the workpiece W. After the first suction pads 30 and the second suction pads 40 have adhered to the product M2, the controller 70 raises the supporting body 20 to lift the product M2. At this time, the lift drivers 51, 61 are applying a downward elastic force to the first presser 50 and the second presser 60, and therefore, the first presser 50 and the second presser 60 extend downward as the supporting body 20 is raised to temporarily maintain the state of pressing against the workpiece W outside the product M2. Such an operation enables the first suction pads 30 and the second suction pads 40 to lift the product M2 while the workpiece W is pressed by the first presser 50 and the second presser 60, and prevents the residual material of the workpiece W outside the product M2 from being also lifted along therewith.

This operation is similar to that of the case with the product M1 described above in that after having raised the supporting body 20 further, the traveling body 10 is caused to travel in the X direction with the product M2 adhered, the struts 11a are moved in the Y direction along the guides 13, the traveling body 10 is stopped at a predetermined position above the product table T2 (see FIG. 1), and the supporting body 20 is lowered to place the product M2 on the product table T2.

Figure 10:
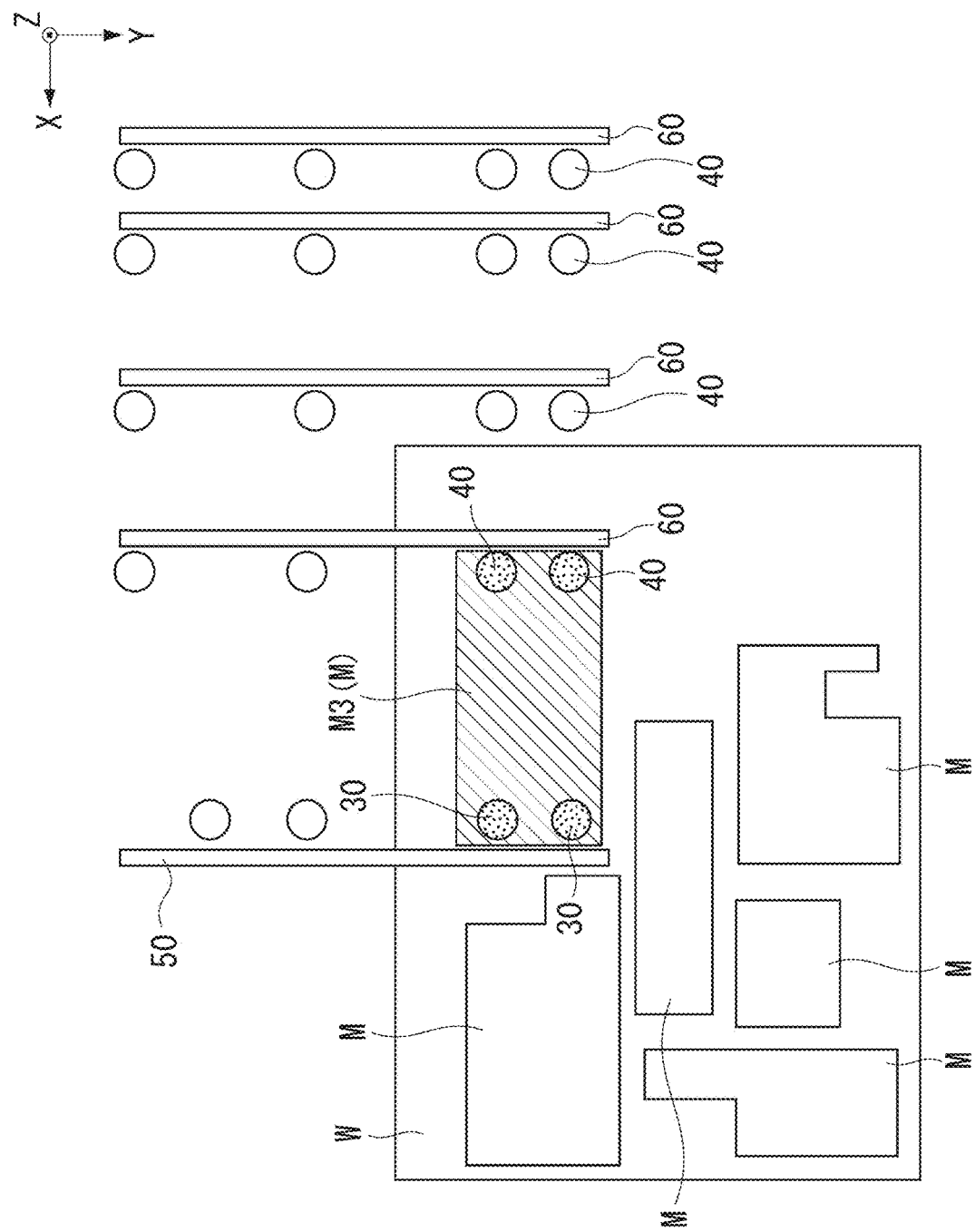
FIG. 10 is a diagram showing the transporter having been arranged with respect to another product in the workpiece.
Figure 11:
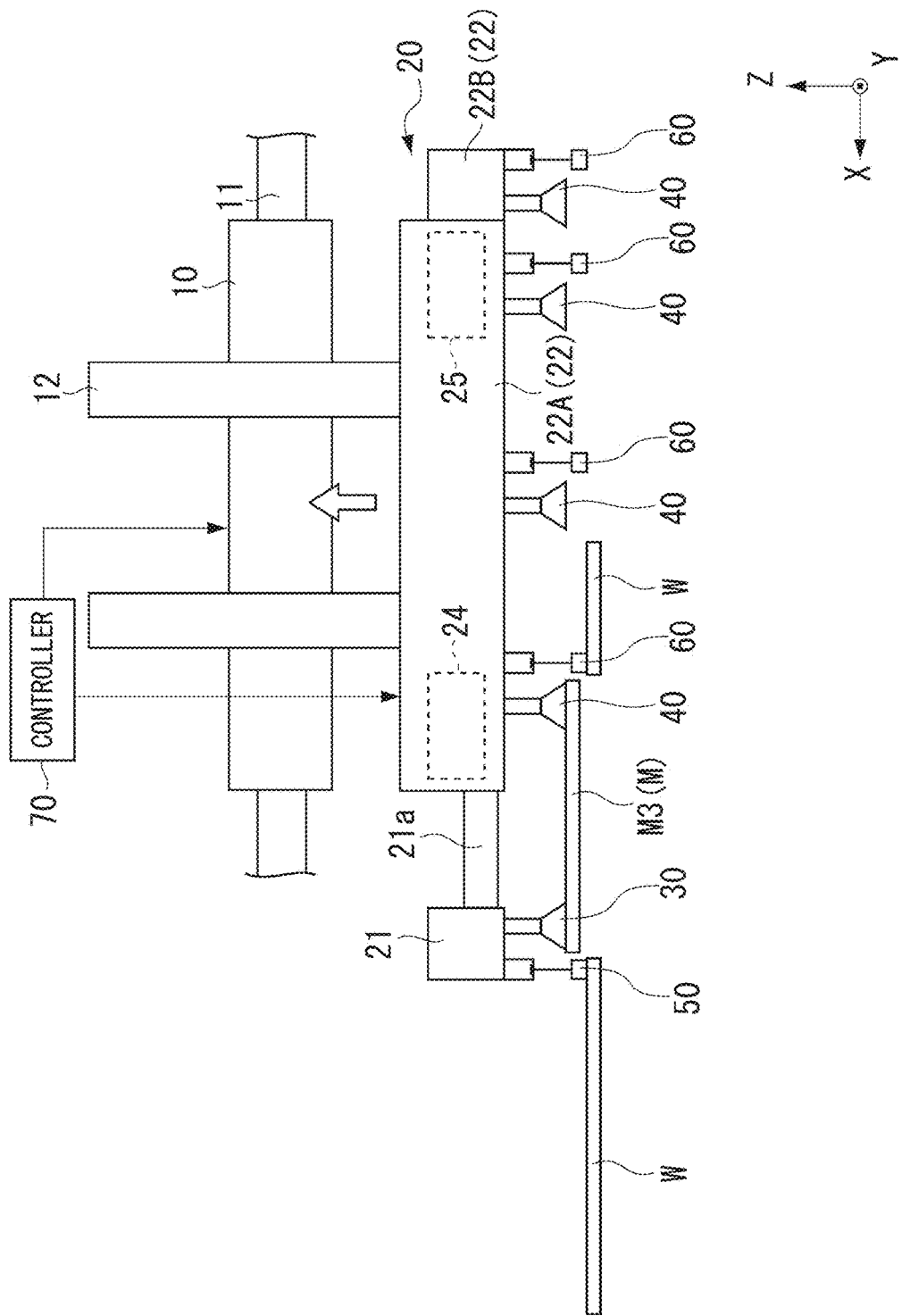
FIG. 11 is a diagram showing a state of the product having been lifted from the workpiece.

FIG. 10 and FIG. 11 are diagrams for describing another example of the operation of transporter 100. FIG. 10 is a plan view showing the transporter 100 having been arranged with respect to a product M3 in the workpiece W. In FIG. 10, the product M3 to be transported is denoted with hatched lines. Hereinafter, a case of transporting the product M3 denoted with hatched lines will be described as an example. As shown in FIG. 10, the controller 70 causes the traveling body 10 to travel in the X direction and causes the struts 11a to move in the Y direction along the guides 13, to arrange the supporting body 20 above the workpiece W.

In such a case, the controller 70 controls the positions of the first member 21 and the second member 22, so that the first suction pads 30 and the second suction pads 40 are positioned inside a contour of the product M3, that is to say, the first suction pads 30 and the second suction pads 40 are arranged overlapping with the product M3 as seen in a plan view, and that the first presser 50 and the second presser 60 are positioned above the workpiece W outside the product M3.

As shown in FIG. 10, the controller 70 takes, for example, the first suction pad 30 on the +X side and on the +Y side as a reference, and selects the first suction pads 30 and the second suction pads 40 to perform adhering according to the dimensions of the product M3. In FIG. 10, the controller 70 selects two first suction pads 30 including the first suction pad 30 on the +X side and on the +Y side, and two second suction pads 40 corresponding respectively in the −X direction to those two first suction pads 30. The controller 70 moves the first member 21 in the +X direction relative to the second member 22 to thereby arrange the two first suction pads 30 above the +X side end of the product M3, arrange the first presser 50 above the workpiece W outside on the +X side with respect to the product M3, arrange the two second suction pads 40 above the −X side end of the product M3, and arrange the second presser 60 above the workpiece W outside on the −X side with respect to the product M3.

With the controller 70 performing control in this manner, adhesion to the product M3 is possible without the presence of the second presser 60 between the first suction pads 30 and the second suction pads 40. That is to say, the controller 70 is not required to perform the control for preliminarily raising the second presser 60 positioned above the product M3 by the lift driver 61.

Next, the controller 70 lowers the supporting body 20 and causes the first suction pads 30 and the second suction pads 40 to press against the product M3. The controller 70 drives the suction device not shown in the drawings and operates the switching valves to start the suction operation of the first suction pads 30 and the second suction pads 40 corresponding to the product M3. In this state where the first suction pads 30 and the second suction pads 40 have adhered to the product M3, the first presser 50 and the second presser 60 are in contact with the workpiece W outside the product M3 and are being pushed upward.

FIG. 11 is a diagram showing a state of the product M3 having been lifted from the workpiece W. After the first suction pads 30 and the second suction pads 40 have adhered to the product M3, the controller 70 raises the supporting body 20 to lift the product M3. At this time, the lift drivers 51, 61 are applying a downward elastic force to the first presser 50 and the second presser 60, and therefore, the first presser 50 and the second presser 60 extend downward as the supporting body 20 is raised to temporarily maintain the state of pressing against the workpiece W outside the product M3. Such an operation enables the first suction pads 30 and the second suction pads 40 to lift the product M3 while the workpiece W is pressed by the first presser 50 and the second presser 60, and prevents the residual material of the workpiece W outside the product M3 from being also lifted along therewith.

This operation is similar to that of the case with the product M1 described above in that after having raised the supporting body 20 further, the traveling body 10 is caused to travel in the X direction with the product M3 adhered, the struts 11a are moved in the Y direction along the guides 13, the traveling body 10 is stopped at a predetermined position above the product table T2 (see FIG. 1), and the supporting body 20 is lowered to place the product M3 on the product table T2.

Figure 12:
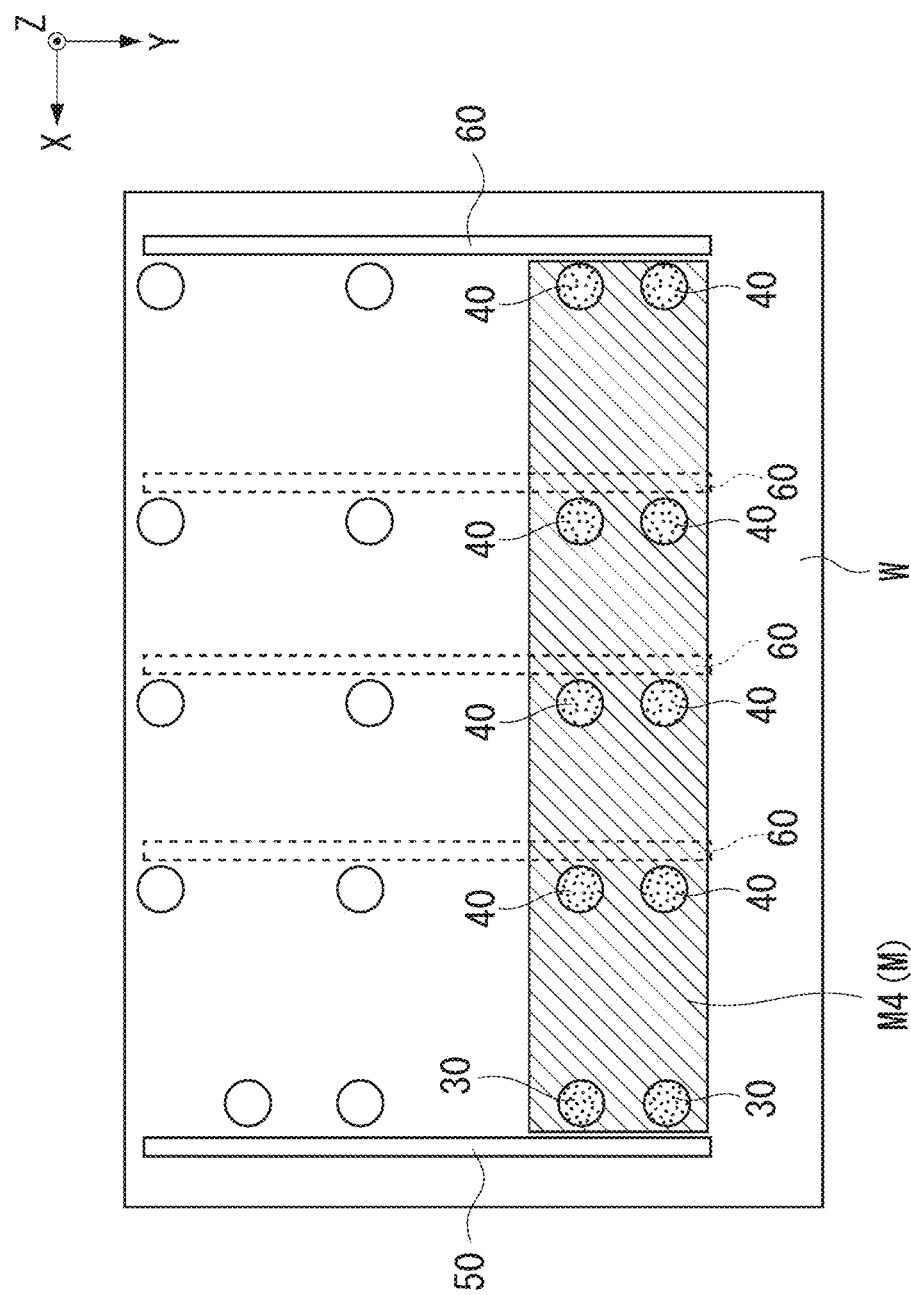
FIG. 12 is a diagram showing the transporter having been arranged with respect to another product in the workpiece.
Figure 13:
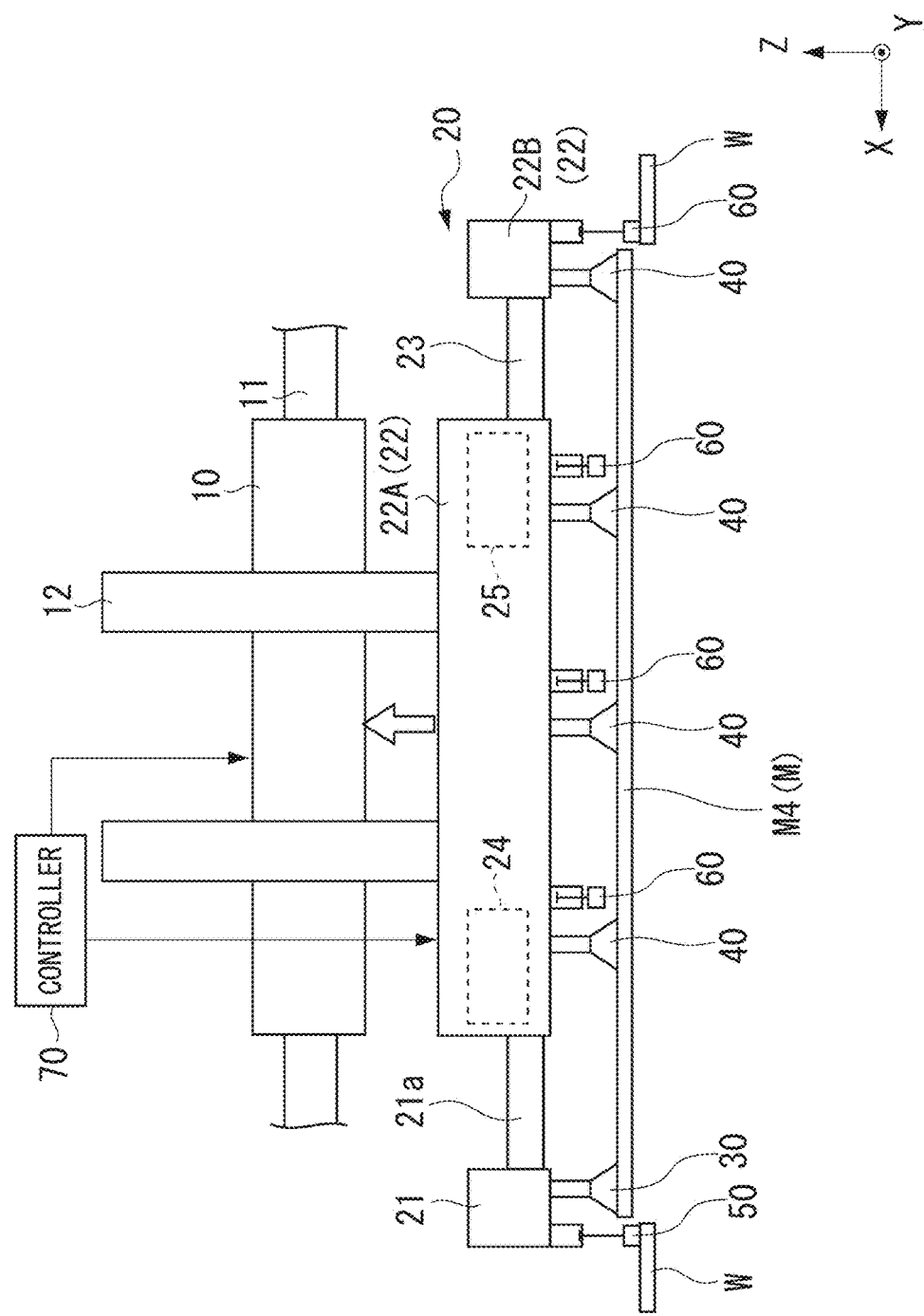
FIG. 13 is a diagram showing a state of the another product having been lifted from the workpiece.

FIG. 12 and FIG. 13 are diagrams for describing another example of the operation of transporter 100. FIG. 12 is a plan view showing the transporter 100 having been arranged with respect to a product M4 in the workpiece W. In FIG. 12, the product M4 to be transported is denoted with hatched lines. Hereinafter, a case of transporting the product M4 denoted with hatched lines will be described as an example. As shown in FIG. 12, the controller 70 causes the traveling body 10 to travel in the X direction and causes the struts 11a to move in the Y direction along the guides 13, to arrange the supporting body 20 above the workpiece W.

In such a case, the controller 70 controls the positions of the first member 21 and the second member 22 (base 22A and extender 22B), so that the first suction pads 30 and the second suction pads 40 are positioned inside a contour of the product M4, that is to say, the first suction pads 30 and the second suction pads 40 are arranged overlapping with the product M4 as seen in a plan view, and that the first presser 50 and the second presser 60 are positioned above the workpiece W outside the product M4.

As shown in FIG. 12, the controller 70 takes, for example, the first suction pad 30 on the +X side and on the +Y side as a reference, and selects the first suction pads 30 and the second suction pads 40 to perform adhering according to the dimensions of the product M4. In FIG. 12, the controller 70 selects two first suction pads 30 including the first suction pad 30 on the +X side and on the +Y side, and eight second suction pads 40 corresponding respectively in the −X direction to those two first suction pads 30.

The controller 70 moves the first member 21 in the +X direction relative to the second member 22 to thereby arrange the two first suction pads 30 above the +X side end of the product M4 and arrange the first presser 50 above the workpiece W outside on the +X side with respect to the product M4. Also, the controller 70 moves the extender 22B in the −X direction relative to the base 22A to thereby arrange the two second suction pads 40 of the extender 22B above the −X side end of the product M4, and arrange the second presser 60 of the extender 22B above the workpiece W outside on the −X side with respect to the product M4.

With the controller 70 performing control in this manner, even in the case where the dimensions are large as with the product M4, by moving the first member 21 in the +X direction and also moving the extender 22B in the −X direction, it is possible to appropriately press the workpiece W outside the product M4 while appropriately adhering to the product M4.

The second pressers 60 arranged above the product M4 are preliminarily raised by the controller 70 controlling the lift drivers 61. That is to say, each of the three second pressers 60 arranged on the base 22A is raised by the corresponding lift drivers 61, and the lower ends of the three second pressers 60 are all positioned above the lower ends of the first suction pads 30 and the second suction pads 40. Such an operation enables to avoid the product M4 from being pressed downward by the second pressers 60 that overlap with the product M4.

FIG. 13 is a diagram showing a state of the product M4 having been lifted from the workpiece W. After the first suction pads 30 and the second suction pads 40 have adhered to the product M4, the controller 70 raises the supporting body 20 to lift the product M4. At this time, the lift drivers 51, 61 are applying a downward elastic force to the first presser 50 and the second presser 60, and therefore, the first presser 50 and the second presser 60 extend downward as the supporting body 20 is raised to temporarily maintain the state of pressing against the workpiece W outside the product M4. Such an operation enables the first suction pads 30 and the second suction pads 40 to lift the product M4 while the workpiece W is pressed by the first presser 50 and the second presser 60, and prevents the residual material of the workpiece W outside the product M4 from being also lifted along therewith.

This operation is similar to that of the case with the product M1 described above in that after having raised the supporting body 20 further, the traveling body 10 is caused to travel in the X direction with the product M4 adhered, the struts 11a are moved in the Y direction along the guides 13, the traveling body 10 is stopped at a predetermined position above the product table T2 (see FIG. 1), and the supporting body 20 is lowered to place the product M4 on the product table T2.

As described above, according to the present preferred embodiment, first suction pads 30 and second suction pads 40 are selected to suit the product M to be adhered, using the first member 21 and the second member 22, the relative positions of which can be mutually changed, and the first presser 50 and the second presser 60 press the workpiece W outside the product M to be adhered. Therefore, when the first suction pads 30 and the second suction pads 40 adhere to and lift the product M, it is possible to prevent the residual material from being also lifted along therewith and pick up the product M from the workpiece W appropriately. Also, the relative positions of the first member and the second member 22 can be changed, and moreover, the relative positions of the base 22A and the extender 22B can be changed on the second member 22. Therefore, it is possible to change the positional relationship between the first presser 50 and the second presser 60 according to the size of the product M, and it is possible to appropriately pick up a product M of a variety of sizes in the workpiece W.

Second Preferred Embodiment

Figure 14:
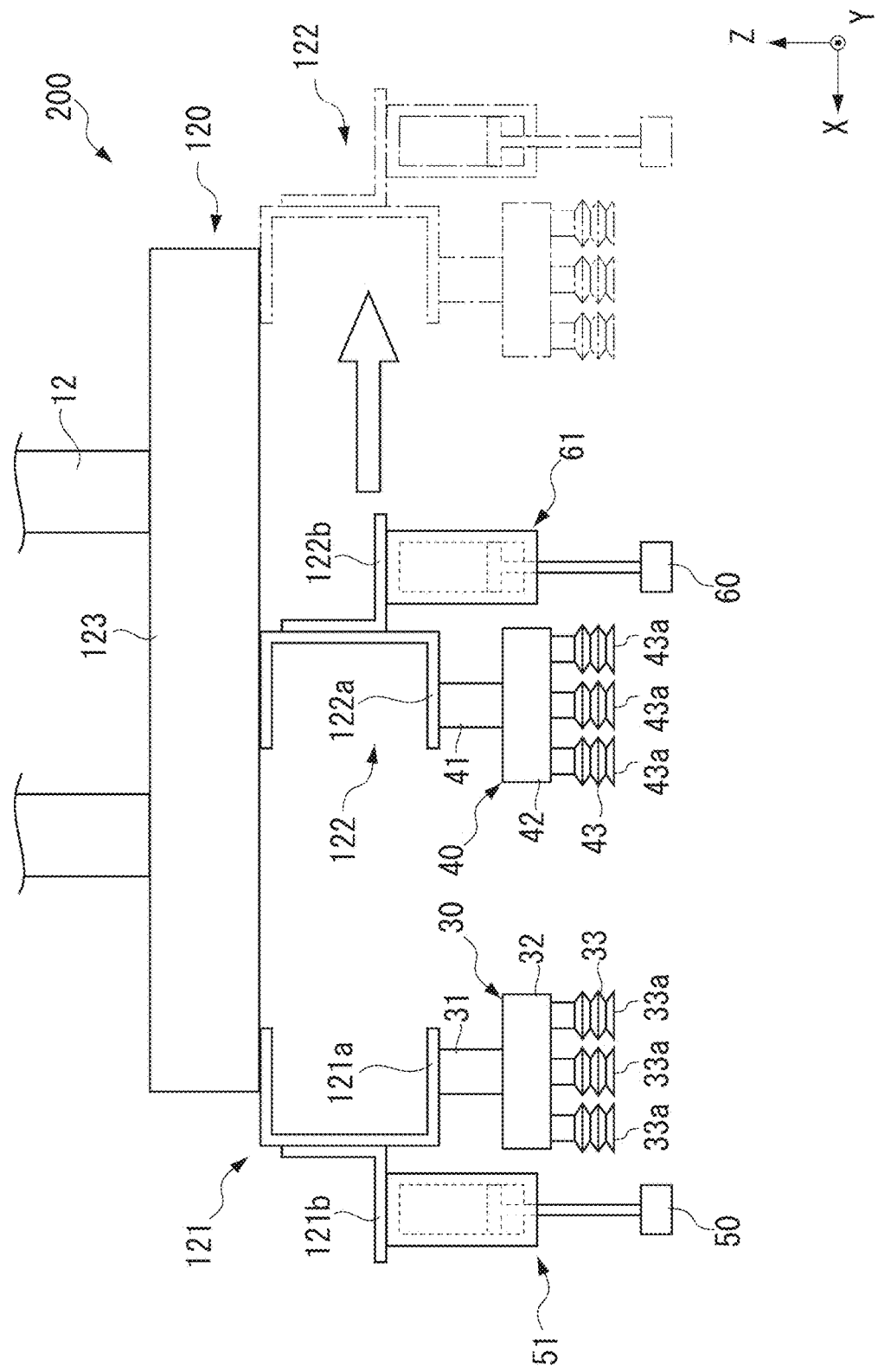
FIG. 14 is a diagram showing an example of a transporter according to a second preferred embodiment of the present invention.
Figure 15:
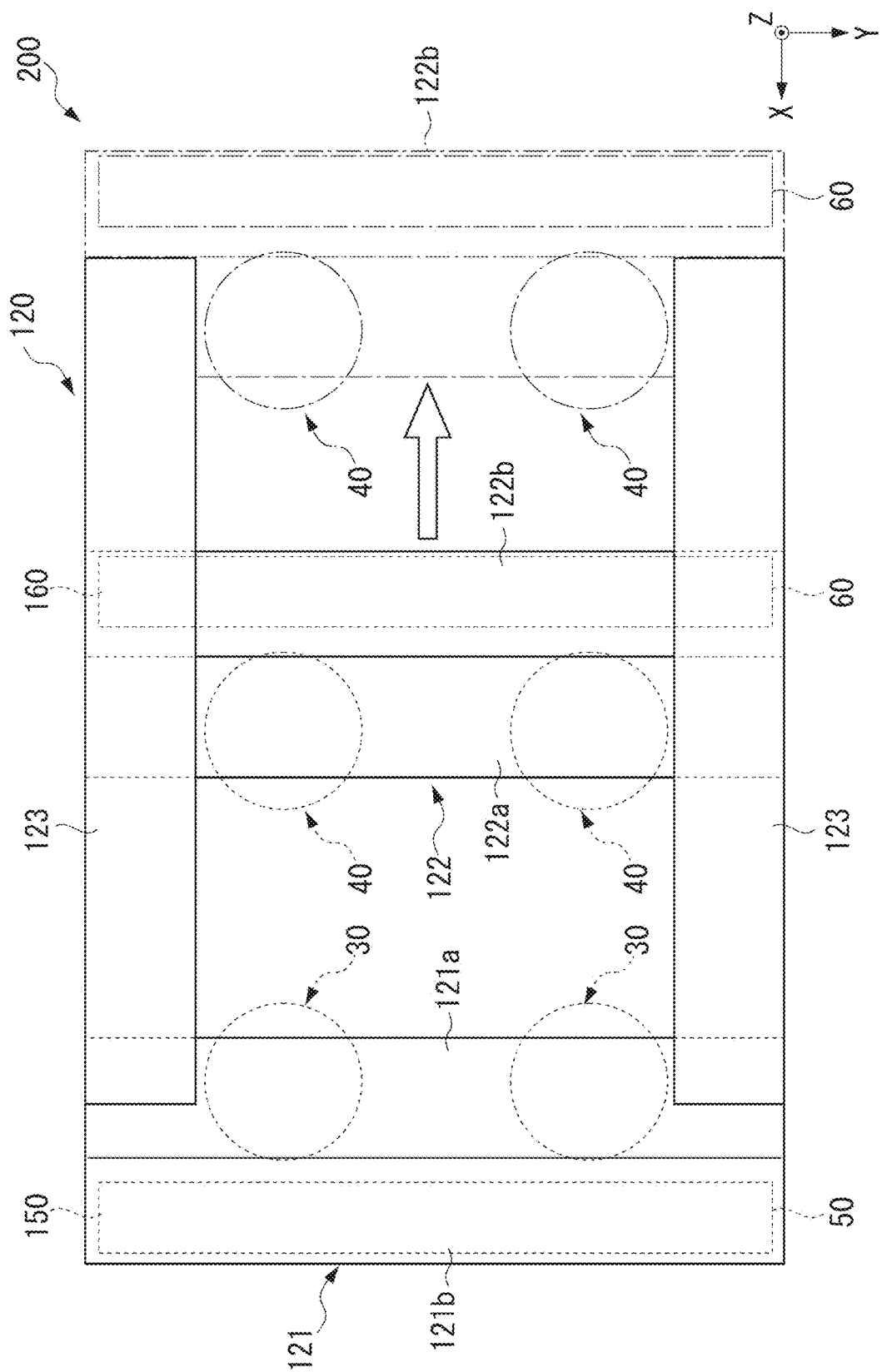
FIG. 15 is a plan view showing another example of the supporting body of the transporter.

FIG. 14 is a diagram showing an example of a transporter 200 according to a second preferred embodiment. FIG. 15 is a plan view showing another example of a supporting body 120 of the transporter 200. The transporter 200 according to the second preferred embodiment differs from the transporter 100 of the first preferred embodiment in terms of the configuration of the supporting body 120, and is similar to the transporter 100 described above in terms of other configurations. The configurations similar to those in the first preferred embodiment are assigned with the same reference signs and the descriptions thereof are omitted or simplified.

As shown in FIG. 14 and FIG. 15, the supporting body 120 of the transporter 200 includes a first member 121, a second member 122, and base platforms 123. The first member 121 includes a pad supporting frame 121a and a presser supporting frame 121b. The presser supporting frame 121b is mounted on the side surface on the +X side of the pad supporting frame 121a. The second member 122 includes a pad supporting frame 122a and a presser supporting frame 122b. The presser supporting frame 122b is mounted on the side surface on the −X side of the pad supporting frame 122a.

First suction pads 30 are mounted on the lower surface of the pad supporting frame 121a of the first member 121. A first presser 50 is mounted on the lower surface of the presser supporting frame 121b. Second suction pads 40 are mounted on the lower surface of the pad supporting frame 122a of the second member 122. A second presser 60 is mounted on the lower surface of the presser supporting frame 122b. The first member 121 and the second member 122 are symmetrical about the YZ plane. The first member 121 is mounted on the lower surfaces on the +X side of the base platforms 123.

The second member 122 is mounted on the lower surfaces of the base platforms 123. It should be noted that the second member 122 may be provided movable in the X direction along the lower surfaces of the base platforms 123, or may be provided detachable at positions on the base platforms 123 different in the X direction. By moving the second member 122 in the X direction, the relative positions of the first member 121 and the second member 122 can be changed in the X direction. Each of the base platforms 123 preferably has a frame shape defined by a plurality of rod-shaped steel members (see FIG. 15). The base platforms 123 are mounted on the lower ends of the lifting bodies 12 of the traveling body 10 and are connected to the traveling body 10 via the elevating bodies 12.

In the transporter 200, only one set of the second suction pads 40 and the second presser 60 are provided on the second member 122, and this one set of the second suction pads 40 and the second presser 60 are moved in the X direction for use. The transporter 200 is of a configuration in which one set of the second suction pads 40 and the second presser 60 are moved in the X direction, and therefore, the configuration can be simplified.

The operation of the transporter 200 is similar to that of the transporter 100 described above. By moving the position of the second member 122 in the X direction according to the dimension in the X direction of the product M to be transported and lowering the supporting body 120 in this state, the first suction pads 30 and the second suction pads 40 adhere to the product M. Then, raising the supporting body 120 enables the first suction pads 30 and the second suction pads 40 to lift the product M while the workpiece W is pressed by the first presser 50 and the second presser 60, and prevents the residual material of the workpiece W outside the product M from being also lifted along therewith.

This operation is similar to that of the first preferred embodiment described above in that after having raised the supporting body 120 further, the traveling body 10 is caused to travel in the X direction with the product M adhered, the struts 11a are moved in the Y direction along the guides 13, the traveling body 10 is stopped at a predetermined position above the product table T2 (see FIG. 1), and the supporting body 120 is lowered to place the product M on the product table T2.

As described above, according to the present preferred embodiment, as with the first preferred embodiment, when the first suction pads 30 and the second suction pads 40 adhere to and lift the product M, it is possible to prevent the residual material from being also lifted along therewith and pick up the product M from the workpiece W appropriately. Also, it is possible to change the positional relationship between the first presser 50 and the second presser 60 according to the size of the product M, and it is possible to appropriately pick up a product M of a variety of sizes in the workpiece W.

FIG. 16 is a diagram showing another example of the first presser 50 and the second presser 60. As shown in FIG. 16, the first presser 50 and the second presser 60 may be provided on the first member 21 or the second member 22 via a supporting member 151, for example, having an elastic body 80 such as a coil spring. The supporting member 151 includes a cylindrical case 151a and an elevation rod 151b that ascends and descends within the case 151a. The first presser 50 (second presser 60) is mounted on the underside of the elevation rod 151b. The elastic body 80 is arranged between the case 151a and the first presser 50 (second presser 60).

With this configuration, the first presser 50 (second presser 60) is raised so as to compress the elastic body 80 when the first suction pads 30 and the second suction pads 40 adhere to the product M, and the compressed elastic body 80 expands when it is raised with the product M adhered to the first suction pads 30 and the second suction pads 40. As a result, the workpiece W can be pressed by the first presser 50 (second presser 60). When the first presser 50 (second presser 60) is not used, the first presser (second presser 60) may be raised together with the supporting member 151.

The preferred embodiments of the invention have been described above. However, the present invention is not limited to the above description, and various modifications may be made without departing from the gist of the present invention. In the preferred embodiments described above, the supporting body 20 is moved in the Y direction by moving the struts 11a of the traveling guide 11 along the guides 13; however, preferred embodiments of the present invention are not limited to this example. For example, a configuration may be applied in which a Y-direction moving body that can move in the Y direction is provided in the traveling body 10, and the lifting bodies 12 are provided on the Y-direction moving body, whereby the supporting body 20 mounted on the lower end of the lifting bodies 12 can move in both the X direction and the Y direction.

One or more of the requirements described in the above preferred embodiments may be omitted in some cases. One or more of the requirements described in the above preferred embodiments may be combined where appropriate.

The contents of Japanese Patent Application No. 2019-106126 and all documents cited in the detailed description of preferred embodiments of the present invention are incorporated herein by reference to the extent permitted by law.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A transporter that holds a product cut out from a plate-shaped workpiece, picks up the product from the workpiece, and transports the product, the transporter comprising:
   a traveling body;
   a supporting body on the traveling body and including a first member and a second member with relative positions that can be mutually changed;
   a first suction pad on the first member to adhere to the product;
   a second suction pad on the second member to adhere to the product;
   a first presser on the first member and capable of being raised or lowered independent of the first suction pad;
   a second presser on the second member and capable of being raised or lowered independent of the second suction pad, the first and second suction pads being between the first and second pressers; and
   a controller configured or programmed to control the relative positions of the first member and the second member so that the first suction pad and the second suction pad are positioned inside a contour of the product to be picked up, and the first presser and the second presser are positioned above the workpiece outside the product to be picked up; wherein
   the first presser is provided on the first member via an elastic body, and in a state of having been lowered, a lower end of the first presser is positioned below a lower end of the first suction pad;
   the second presser is provided on the second member via an elastic body, and in a state of having been lowered, a lower end of the second presser is positioned below a lower end of the second suction pad;
   the second member includes a lift driver to raise or lower each of a plurality of second pressers including the second presser;
   the controller is configured or programmed to cause the lift driver to raise one of the plurality of second pressers, which is positioned above the product to be picked up and between the first presser and the second presser positioned outside the product to be picked up, above the lower end of the second suction pad; and
   the controller is configured or programmed to select suction pads positioned above the product to be picked up and between the first presser and the second presser positioned outside the product to be picked up, including the first suction pad and the second suction pad, to be used to adhere to the product.

2. The transporter according to claim 1, wherein each of the first presser and the second presser includes a rod.

3. The transporter according to claim 2, wherein the rod of each of the first and second pressers is arranged such that a longitudinal direction thereof extends along a direction orthogonal or substantially orthogonal to the direction in which the first member and the second member move relative to each other.

4. The transporter according to claim 2, wherein
a plurality of the first suction pads are provided along an extending direction of the first presser; and
a plurality of the second suction pads are provided along an extending direction of the second presser.

5. The transporter according to claim 1, wherein
the second member includes a base and an extender that can move relative to the base in a direction in which the first member and the second member move relative to each other; and
the second suction pad and the second presser are provided on both the base and the extender.

6. The transporter according to claim 1, wherein the supporting body is movable in an orthogonal direction that is orthogonal or substantially orthogonal to a traveling direction of the traveling body.

7. The transporter according to claim 6, wherein the controller is configured or programmed to:
select the first suction pad and the second suction pad to be used according to a size of the product to be picked up; and
control a position of the traveling body in the traveling direction thereof, a position of the supporting body in the orthogonal direction, and the relative positions of the first member and the second member so that the first suction pad and the second suction pad selected are positioned inside a contour of the product to be picked up, and the first presser and the second presser are positioned above the workpiece outside the product to be picked up.

* * * * *